US011361589B2

(12) United States Patent
Zhang et al.

(10) Patent No.: US 11,361,589 B2
(45) Date of Patent: Jun. 14, 2022

(54) IMAGE RECOGNITION METHOD, APPARATUS, AND STORAGE MEDIUM

(71) Applicant: SENSETIME INTERNATIONAL PTE. LTD., Singapore (SG)

(72) Inventors: Mingyuan Zhang, SG (SG); Jinyi Wu, SG (SG); Haiyu Zhao, SG (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/070,262

(22) Filed: Oct. 14, 2020

(65) Prior Publication Data

US 2021/0312165 A1 Oct. 7, 2021

Related U.S. Application Data

(63) Continuation of application No. PCT/IB2020/058350, filed on Sep. 9, 2020.

(30) Foreign Application Priority Data

Apr. 1, 2020 (SG) .......................... 10202003027Q

(51) Int. Cl.
*G06V 40/00* (2022.01)
*G06V 40/16* (2022.01)

(52) U.S. Cl.
CPC .......... *G06V 40/172* (2022.01); *G06V 40/161* (2022.01); *G06V 40/168* (2022.01)

(58) Field of Classification Search
CPC ........... G06K 9/00288; G06K 9/00228; G06K 9/00268; G06V 40/172; G06V 40/161
See application file for complete search history.

(56) References Cited

U.S. PATENT DOCUMENTS

2005/0271279 A1 12/2005 Fujimura
2008/0123968 A1 5/2008 Nevatia
(Continued)

FOREIGN PATENT DOCUMENTS

CN 101406390 A 4/2009
CN 109325450 A 2/2019
(Continued)

OTHER PUBLICATIONS

Written Opinion of the Singaporean application No. 10202003027Q, dated Jun. 18, 2020, 11 pgs.
(Continued)

*Primary Examiner* — Md K Talukder
(74) *Attorney, Agent, or Firm* — Cooper Legal Group, LLC

(57) ABSTRACT

An image recognition method includes: performing image detection on an image to be recognized to obtain at least one face detection result, at least one operational part detection result, and at least one trunk detection result, each face detection result including one face bounding box, each operational part detection result including one operational part bounding box, and each trunk detection result including one trunk bounding box; respectively combining each of the at least one trunk detection result with each face detection result, to obtain at least one first result combination; respectively combining each trunk detection result with each operational part detection result, to obtain at least one second result combination; and associating the at least one first result combination with the at least one second result combination, to obtain an association result.

20 Claims, 9 Drawing Sheets

(56) References Cited

U.S. PATENT DOCUMENTS

| | | | |
|---|---|---|---|
| 2011/0069888 A1* | 3/2011 | Lim | G06V 40/103 382/190 |
| 2013/0271458 A1 | 10/2013 | Andriluka | |
| 2013/0272570 A1* | 10/2013 | Sheng | G06F 3/0484 382/103 |
| 2018/0181797 A1* | 6/2018 | Han | G06V 10/82 |
| 2019/0316966 A1* | 10/2019 | Yokoyama | G06V 40/10 |
| 2021/0272253 A1* | 9/2021 | Lin | G06V 40/161 |
| 2021/0312165 A1* | 10/2021 | Zhang | G06V 40/168 |

FOREIGN PATENT DOCUMENTS

| | | |
|---|---|---|
| CN | 110188701 A | 8/2019 |
| KR | 20190130218 A | 11/2019 |

OTHER PUBLICATIONS

International Search Report in the international application No. PCT/IB2020/058350, dated Jan. 6, 2021, 4 pgs.

Written Opinion of the International Search Authority in the international application No. PCT/IB2020/058350, dated Jan. 6, 2021, 5 pgs.

"Simultaneous Tracking of Multiple Body Parts of Interacting Persons", 2006, Sangho Park and J.K. Aggarwal, Science Direct, Computer Vision and Image Understanding, vol. 102, pp. 1-21.

First Office Action of the Australian appplication No. 2020294186, dated Sep. 30, 2021, 6 pgs.

* cited by examiner

IMAGE RECOGNITION METHOD, APPARATUS, AND STORAGE MEDIUM

CROSS REFERENCE TO RELATED APPLICATIONS

This application is a continuation of International Application No. PCT/IB2020/058350, filed on Sep. 9, 2020, which claims priority to Singaporean Patent Application No. 10202003027Q, filed on Apr. 1, 2020. The disclosures of International Application No. PCT/IB2020/058350 and Singaporean Patent Application No. 10202003027Q are hereby incorporated by reference in their entireties.

BACKGROUND

As the development of image recognition technologies, the image recognition apparatus may associate and match the face and operational part in the image picture, for example, a hand of a person, i.e., recognizing whether the face and operational part belong to the same person. Currently, two types of methods for associating the face and the operational part are included; one is to first respectively recognize multiple faces and multiple operational parts from an image and then use a deep learning model to deduce the relation between the face and the operational part; the other one is to associate the face and the operational part based on an association algorithm of body key points.

However, when using the deep learning model to deduce the relation between the face and the operational part, for each combination of the faces and operational parts, the deep learning model is required to be invoked; while when the face is distant from the operational part, it would be difficult for the deep learning model to determine the relation between the face and the operational part, rendering low accuracy of the association between the face and the operational part; when using the association algorithm of the body key points, since multiple bodies exist in the image, the key points would loss some of the body information, rendering low accuracy of the association between the face and the operational part.

SUMMARY

Embodiments of the present disclosure relate to, but is not limited to, an image processing technology, and in particular, to an image recognition method, apparatus, and a storage medium.

Embodiments of the present disclosure provide an image recognition method and apparatus and a storage device, capable of improving accuracy of association between a face and an operational part.

The embodiments of the present disclosure provide an image recognition method, including: performing image detection on an image to be recognized to obtain at least one face detection result, at least one operational part detection result, and at least one trunk detection result; each face detection result including one face bounding box, each operational part detection result including one operational part bounding box, and each trunk detection result including one trunk bounding box; respectively combining each of the at least one trunk detection result with each face detection result, to obtain at least one first result combination; respectively combining each trunk detection result with each operational part detection result, to obtain at least one second result combination; and associating the at least one first result combination with the at least one second result combination, to obtain an association result.

The embodiments of the present disclosure provide an electronic device, including: a memory, configured to store computer-executable instructions; and a processor, configured to execute the stored computer-executable instructions to perform operations of: performing image detection on an image to be recognized to obtain at least one face detection result, at least one operational part detection result and at least one trunk detection result, each face detection result comprising one face bounding box, each operational part detection result comprising one operational part bounding box, and each trunk detection result comprising one trunk bounding box; respectively combining each of the at least one trunk detection result with each face detection result, to obtain at least one first result combination; respectively combining each trunk detection result with each operational part detection result, to obtain at least one second result combination; and associating the at least one first result combination with the at least one second result combination, to obtain an association result.

The embodiments of the present disclosure provide a non-transitory storage medium, storing computer-executable instructions that, when executed by a processor, cause the processor to perform an image recognition method, the method including: performing image detection on an image to be recognized to obtain at least one face detection result, at least one operational part detection result and at least one trunk detection result, each face detection result comprising one face bounding box, each operational part detection result comprising one operational part bounding box, and each trunk detection result comprising one trunk bounding box; respectively combining each of the at least one trunk detection result with each face detection result, to obtain at least one first result combination; respectively combining each trunk detection result with each operational part detection result, to obtain at least one second result combination; and associating the at least one first result combination with the at least one second result combination, to obtain an association result.

DETAILED DESCRIPTION

The technical solutions in the embodiments of the present disclosure are clearly and completely described below with reference to the accompanying drawings in the embodiments of the present disclosure.

Figure 1:
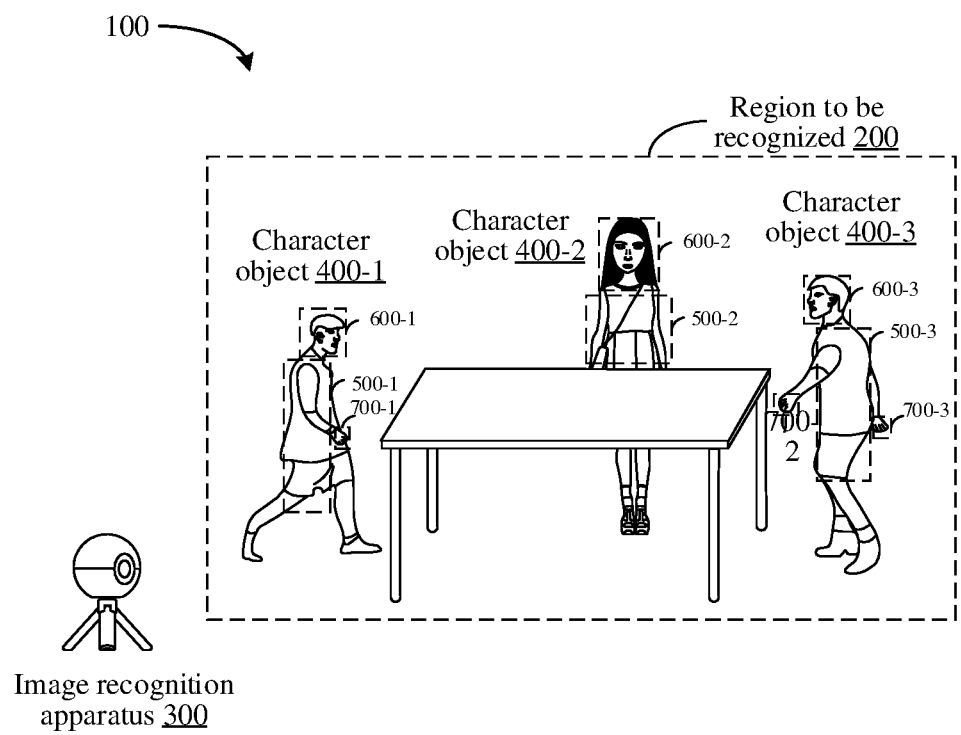
FIG. 1 is a schematic diagram of an image recognition scene 100 provided by the embodiments of the present disclosure.

The embodiments of the present disclosure provide an image recognition scene, as shown in FIG. 1; FIG. 1 is a schematic diagram of an image recognition scene 100 provided by the embodiments of the present disclosure. In the image recognition scene 100, an image recognition apparatus 300 for performing image recognition on a region 200 to be recognized is included; in the region 200 to be recognized, at least one character object is included (exemplarily showing character object 400-1, character object 400-2, and character object 400-3), where each character object 400 may be distinguished by means of a face. The image recognition apparatus 300 may be disposed at a front or side of the region 200 to be recognized, so as to perform image recognition on the region 200 to be recognized at a parallel angel. Specifically, the image recognition apparatus 300 may perform image collection on the region 200 to be recognized, then detect the trunk detection result 500 (exemplarily showing trunk detection result 500-1, trunk detection result 500-2, and trunk detection result 500-3), the face detection result 600 (exemplarily showing face detection result 600-1, face detection result 600-2, and face detection result 600-3), and the operational part detection result 700 (exemplarily showing operational part detection result 700-1, operational part detection result 700-2, and operational part detection result 700-3) from the collected image, and then perform association analysis on these detection results, so as to further determine the relation between the face and the operational part in the image picture, i.e., determining whether the operational part detection result 700 belongs to which character object in the character objects 400, so that when any operational part detection result in the operational part detection results 700 moves, the image recognition apparatus may determine which character object in the character object detection 400 moves by means of the operational part.

As can be understood, in some embodiments of the present disclosure, the operational part may refer to a hand of the character object 400 or may also refer to other parts.

Figure 2:
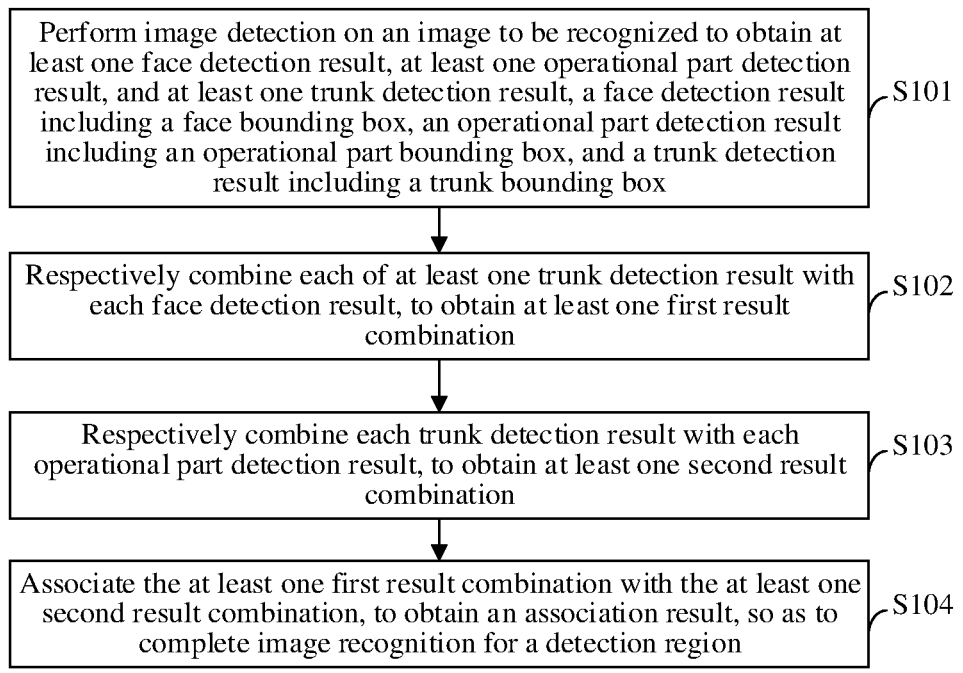
FIG. 2 is an optional flow chart I of the image recognition method provided by the embodiments of the present disclosure.

With reference to FIG. 2, FIG. 2 is an optional flow chart I of the image recognition method provided by the embodiments of the present disclosure. The image recognition method provided by the embodiments of the present disclosure includes S101-S104.

In S101, image detection is performed on an image to be recognized to obtain at least one face detection result, at least one operational part detection result and at least one trunk detection result are obtained; a face detection result includes a face bounding box, an operational part detection result includes an operational part bounding box, and a trunk detection result includes a trunk bounding box.

The embodiments of the present disclosure are achieved in a scene requiring to recognize the image picture and further associate the face and operational part in the image picture, for example, the scene of associating the face and operational part of each student in the class, so as to distinguish behaviors of different students; and for another example, the scene of associating the face and operational part of each passenger on a bus, so as to distinguish behaviors of different passengers, and the like. During image recognition, first a set image collection device collects the image picture of the detection region in real time and uses the image picture collected in real time as the image to be recognized. In the image collected in real time, photographs of multiple characters exist; however, due to shielding among persons, the correspondence between the face and the operational part cannot be seen, i.e., it cannot be distinguished which operational part belongs to which face. After obtaining the image to be recognized, the pre-stored detection model would be used for detecting all faces, all operational parts, and all trunks in the image to be recognized; the face bounding box is used for selecting a face image by means of a box; the operational part bounding box is used for selecting an operational part image by means of a box; the trunk bounding box is used for selecting the trunk image by means of a box; in this way, at least one face detection result, at least one operational part detection result, and at least one trunk detection result, can be obtained.

It should be noted that the detection region refers to a region in any one of the image recognition scene that requires image recognition; the detection region can be set manually, and can also be automatically analyzed by using an image processing technology. In fact, the image of each detection region can be collected using multiple image collection devices.

It can be understood that the image collection devices may be high-definition cameras, etc. At this time, the obtained image to be recognized is a single photo of the detection region. The image collection devices may also be video cameras, and the obtained image to be recognized is a video sequence of the detection region.

In some embodiments of the present disclosure, the image collection devices may be color collection devices; the collected image to be recognized may be a color image; the devices may be gray collection devices and the collected image to be recognized may be a gray image.

As can be understood that the detection model is a trained detection model; the model may a deep learning model for processing the image, for example, a Convolutional Neural Network (CNN) model, and may also be other network models; the embodiments of the present disclosure do not define herein.

It should be explained that the detection model in the embodiments of the present disclosure may be a model trained together by using a face training image, an operational part training image, and a trunk training image; at this time, one detection model should be used so as to detect all of the face detection result, operational part detection result, and trunk detection result in the image to be recognized; certainly, the detection model in the embodiments of the present disclosure may also be three different models trained respectively using the face training image, operational part training image, and trunk training image; at this time, the image to be recognized may be separately input into the three detection models, to respectively obtain the face detection result, operational part detection result, and trunk detection result.

In the embodiments of the present disclosure, the operational part refers to the part in the photograph of the character for performing each action, for example, a hand, a foot, etc. of the character; the trunk part refers to the parts except for the operational part and the face in the photograph of the character.

In S102, each of the at least one trunk detection result is respectively combined with each face detection result, to obtain at least one first result combination.

After receiving the at least one face detection result, the at least one operational part detection result, and the at least one trunk detection result, each of the at least one trunk detection result would be used for combining with each face detection result in the at least one face detection result, to obtain the combination of the trunk detection result and the face detection result; the combination is used as the first result combination. Since the at least one trunk detection result includes one or more trunk detection results, and the at least one face detection result also includes one or more face detection results, at least one first result combination can be obtained.

Furthermore, the obtained number of the first result combinations equals to a product of the number of the trunk detection results and the number of the face detection results. When one trunk detection result is combined with each face detection result, the first result combinations of the number of the face detection results can be obtained; there is at least one trunk detection result, thus the first result combinations whose number is equal to the product of the number of the trunk detection results and the number of the face detection results will be obtained.

Exemplarily, when two trunk detection results and three face detection results (since the shielding reason, the trunk part of one character is not detected) are detected in the detection region, where the two trunk detection results are respectively trunk result-1 and trunk result-2; the three face detection results are respectively face result-1, face result-2, and face result-3; at this time, trunk result-1 can be used for being separately combined with face result-1, face result-2, and face result-3, to obtain three first result combinations, i.e., <trunk result-1, face result-1>, <trunk result-1, face result-2>, and <trunk result-1, face result-3>; then trunk result-2 is separately used for being combined with face result-1, face result-2, and face result-3, to further obtain three first result combinations, i.e., <trunk result-2, face result-1>, <trunk result-2, face result-2>, and <trunk result-2, face result-3>. In this way, six first result combinations are obtained in total.

In S103, each trunk detection result are respectively combined with each operational part detection result, to obtain at least one second result combination.

Each trunk detection result and each operational part detection result in the at least one operational part detection result are combined to obtain the combination of the trunk detection result and the operational part detection result, and the combination is used as the second result combination. Moreover, similar to the first combination result, since the at least one trunk detection result has one or more trunk detection results, and the at least one operational part detection result also has one or more operational part detection result, at least one second result combination can be obtained.

As can be understood that, similar to the first combination result, the number of the second result combinations obtained by means of the image recognition apparatus is the same as the product of the number of the trunk detection results and the number of the operational part detection results.

Exemplarily, when two trunk detection results and four operational part detection results are detected in the detection region by means of the image recognition apparatus, where the trunk detection results are respectively trunk result-1 and trunk result-2; the operational part detection results are respectively operational part result-1, operational part result-2, operational part result-3, and operational part result-4; at this time, trunk result-1 can be used for being separately combined with operational part result-1, operational part result-2, operational part result-3, and operational part result-4, to obtain four second result combinations, i.e., <trunk result-1, operational part result-1>, <trunk result-1, operational part result-2>, <trunk result-1, operational part result-3>, and <trunk result-1, operational part result-4>; then trunk result-2 is further separately used for being combined with operational part result-1, operational part result-2, operational part result-3, and operational part result-4, to obtain four second result combinations, i.e., <trunk result-2, operational part result-1>, <trunk result-2, operational part result-2>, <trunk result-2, operational part result-3>, and <trunk result-2, operational part result-4>. In this way, eight second result combinations are obtained in total.

In S104, the at least one first result combination is associated with the at least one second result combination, to obtain an association result.

After obtaining at least one first result combination and at least one second result combination, each first result combination in the at least one result combination can be associated with each second result combination in the at least second result combination, i.e., determining whether the face detection result and the operational part detection result belong to the same person, and using the determining result as the association result, so as to complete the image recognition of the detection region, so as to further determine the relation between each face and each operational part in the detection region. Herein, the association result refers to a face and a hand that correspond to a same trunk, in other words, a trunk, a face and a hand are obtained that belong to a same person.

It should be explained that, in the embodiments of the present disclosure, when associating the first result combination with the second result combination, it is determined first whether the trunk detection result and the face detection result in each first result combination belong to the same person, and then it is determined whether the trunk detection result and the operational part detection result in each second result combination belong to the same person; when the trunk detection result and the face detection result in one first result combination belong to the same person and the trunk detection result and the operational part detection result in the second result combination including the trunk detection result in the first result combination belong to the same person, the first result combination is associated with the second result combination, i.e., the face detection result in the first result combination and the operational part detection result in the second result combination also belong to the same person, i.e., the trunk detection result can be used for associating the face detection result with the operational part detection result.

In the embodiments of the present disclosure, image detection is performed on the image to be recognized, to obtain at least one face detection result, at least one operational detection result, and at least one trunk detection result, and then each of the at least one trunk detection result is separately combined with each face detection result to obtain at least one first result combination; then each trunk detection result is used for being separately combined with each operational part detection result, to obtain at least one second result combination; finally, the at least one first result is integrated and associated with the at least one second result combination, to obtain the association result, so as to complete the image recognition of the detection region. By means of the modes above, the relation between the trunk detection result and the face detection result and the relation between the trunk detection result and the operational part detection result can be determined, so as to use the trunk detection result to associate the face detection result with the operational part detection result, which lowers the difficulty for determining the face and the operational part, would not lose key information of a body in the image at the same time, and improves the accuracy of the association between the face and the operational part.

Figure 3:
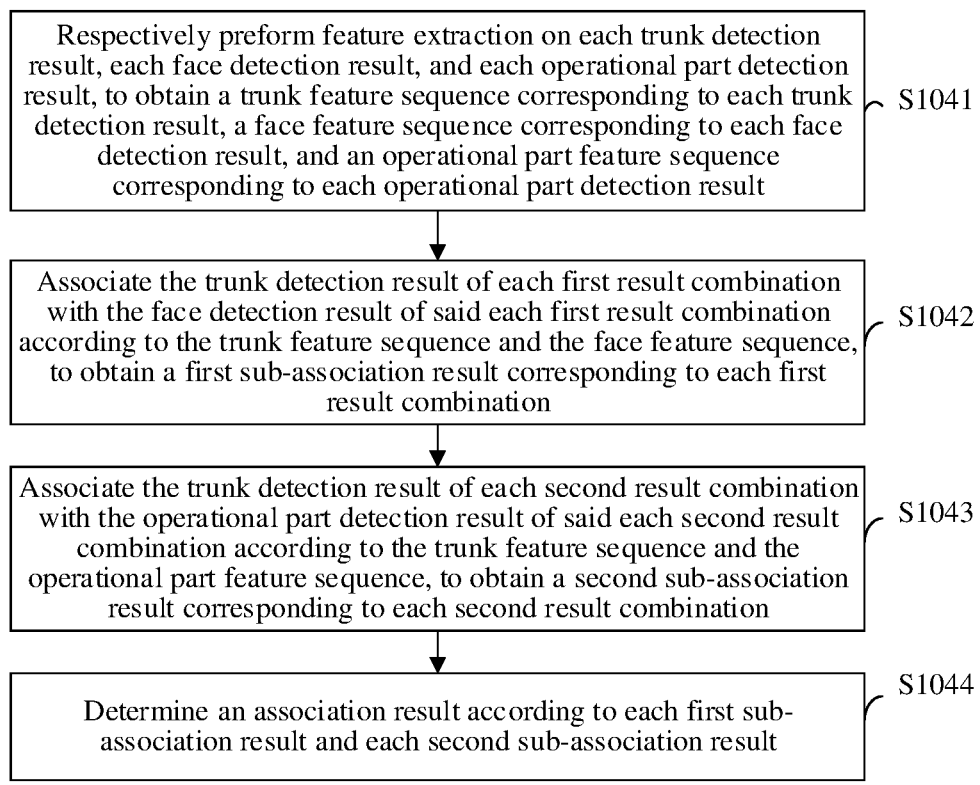
FIG. 3 is an optional flow chart II of the image recognition method provided by the embodiments of the present disclosure.

With reference to FIG. 3, FIG. 3 is an optional flow chart II of the image recognition method provided by the embodiments of the present disclosure. In some embodiments of the present disclosure, the at least one first result combination is associated with the at least one second result combination, to obtain the association result, i.e., the specific implementing process of S104 may include: S1041-S1044, as follows.

In S1041, feature extraction is respectively performed on each trunk detection result, each face detection result and each operational part detection result, to obtain a trunk feature sequence corresponding to each trunk detection result, a face feature sequence corresponding to each face detection result, and an operational part feature sequence corresponding to each operational part detection result.

When associating the at least one first result combination and the at least one second result combination, it is required to first know the feature sequence corresponding to the trunk detection result in the first result combination and the feature sequence corresponding to the face detection result; similarly, it is also required to know the feature sequence corresponding to the operational part detection result in the second result combination so as to respectively determine, according to these feature sequences, whether the trunk detection result is associated with the face detection result and whether the trunk detection result is associated with the operational part detection result. Hence, feature extraction is required to be first performed on each trunk detection result, each face detection result and each operational part detection result, to obtain a trunk feature sequence corresponding to each trunk detection result, a face feature sequence corresponding to each face detection result, and an operational part feature sequence corresponding to each operational part detection result.

It should be explained that in the embodiments of the present disclosure, the feature sequence consists of the position feature and the appearance feature, that is, the trunk feature sequence is formed by combining the trunk position feature and the trunk appearance feature, and the face feature sequence is formed by combining the face position feature and the face appearance feature; similarly, the operational part feature sequence is formed by combining the operational part position feature and the operational part appearance feature.

In S1042, the trunk detection result of each first result combination is associated with the face detection result of said each first result combination according to the trunk feature sequence and the face feature sequence, to obtain a first sub-association result corresponding to each first result combination.

The obtained trunk feature sequence and face feature sequence are used for determining whether the trunk detection result and the face detection result in each first result combination belong to the same person, and the determining result is used as the first sub-association result; in this way, the first sub-association result corresponding to each first result combination would be obtained, i.e., obtaining at least one first sub-association result.

It should be explained that since for the trunk detection result and the face detection result for the same person, a certain rule may exist in the position relation, for example, a distance range would exist between the face of the person and the trunk of the person, they would not be distant far apart and would not be too close, either; meanwhile, for the trunk detection result and the face detection result for the same person, similar spots would also exist in appearance, for example, the skin color of the face and the trunk would be similar; moreover, the trunk feature sequence consists of the trunk position feature and the trunk appearance feature by means of combination, and the face feature sequence consists of the face position feature and the face appearance feature by means of combination, and therefore, the trunk feature sequence and the face feature sequence can be used for determining whether the trunk detection result and the face detection result belong to the same person, so as to obtain the first sub-association result.

In S1043, the trunk detection result of each second result combination is associated with the operational part detection result of said each second result combination according to the trunk feature sequence and the operational part feature sequence, to obtain a second sub-association result corresponding to each second result combination.

Moreover, the trunk feature sequence and the operational part feature sequence can be used for determining whether the trunk detection result and the operational part detection result belong to the same person, and using the determining result as the second sub-association result; in this way, at least one second sub-association result having one-to-one correspondence to each second result combination can be obtained.

Similar to S1042, for the trunk detection result and the operational part detection result for the same person, a certain rule may exist in the position relation, for example, a distance range would exist between the operational part of the person, e.g., the hand, and the trunk of the person; similarly, for the trunk detection result and the operational detection result for the same person, similar spots would also exist in appearance, for example, the skin color of the operational part and the a part of the trunk, for example, the wrist, elbow, and etc. would be similar; similarly, the operational part feature sequence consists of the operational part position feature and the operational part appearance feature by means of combination, and therefore, the trunk feature sequence and the operational part feature sequence can be used for determining whether the trunk detection result and the operational part detection result belong to the same person, so as to obtain the second sub-association result.

In S1044, the association result is determined according to each first sub-association result and each second sub-association result.

After obtaining the first sub-association result and the second sub-association result, the first sub-association result and the second sub-association result can be analyzed, and the final analysis result is used as the association result. In this way, it can be determined whether the face detection result and the operational part detection result belong to the same person, so as to complete the image recognition process of the detection region.

In the embodiments of the present disclosure, the trunk feature sequence corresponding to each trunk detection result, the face feature sequence corresponding to each face detection result, and the operational part feature sequence corresponding to each operational part detection result can first be extracted, respectively; then according to the trunk feature sequence and the face feature sequence, the trunk detection result and the face detection result in each first result combination are associated, to obtain the first sub-association result corresponding to the first result combination, and according to the trunk feature sequence and the operational part feature sequence, the trunk detection result and the operational part detection result in each second result combination are associated, to obtain the second sub-association result corresponding to the second result combination; and finally, according to each first sub-association result and each second sub-association result, the final association result is determined. In this way, the association process for at least one first result combination and at least one second result combination is completed, the relation among the trunk detection result, the face detection result, and the operational part detection result in the image to be recognized is determined, and the image recognition process for a detection region is completed.

In some embodiments of the present disclosure, determining the association result according to each first sub-association result and each second sub-association result, i.e., the specific implementing process of S1044, may include: S1044a-S1044c, as follows.

In S1044a, associated first result combinations having the trunk detection result associated with the face detection result in the at least one first result combination are determined according to each first sub-association result.

After obtaining each first sub-association result, according to each first sub-association result, whether the trunk detection result and the face detection result in each first result combination are associated can be determined, i.e., determining whether the trunk detection result and the face detection result in each first result combination belong to the same person; and then the first result combinations having the trunk detection result associated with the face detection result in each first result combination can be selected as the associated first result combinations.

In S1044b, associated second result combinations having the trunk detection result associated with the operational part detection result in the at least one second result combination are determined according to each second sub-association result.

Similarly, after obtaining each second sub-association result, according to each second sub-association result, whether the trunk detection result and the operational part detection result in each second result combination are associated can be determined, i.e., determining whether the trunk detection result and the operational part detection result in each second result combination belong to the same person; and then the second result combinations having the trunk detection result associated with the operational part detection result in each second result combination can be selected as the associated second result combinations.

In S1044c, it is determined that the associated first result combination and the associated second result combination having a same trunk detection result are associated to obtain the association result, where a face represented by the face detection result in the associated first result combination is mutually associated with an operational part represented by the operational part detection result in the associated second result combination that is associated with the associated first result combination.

The associated first result combination and the associated second result combination are classified according to the trunk detection result; the associated first result combination and the associated second result combination having a same trunk detection result are necessarily associated; at this time, the association results are the face detection result in the associated first result combination having a same trunk detection result associated with the operational part detection result in the associated second result combination.

In the embodiments of the present disclosure, according to the first sub-association result and the second sub-association result, the associated first result combination and the associated second result combination can be selected, so as to mutually associating the associated first result combination and the associated second result combination having a same trunk detection result; in this way, whether the face detection result and the operational part detection result belong to the same person can be determined, so as to obtain the association result.

In some embodiments of the present disclosure, the trunk detection result of each first result combination is associated with the face detection result of said each first result combination according to the trunk feature sequence and the face feature sequence, to obtain a first sub-association result corresponding to each first result combination, i.e., the specific implementing process of S1042 may also include: S1042a-S1042b, as follows.

In S1042a, for each of the at least one first result combination, a first combination feature corresponding to the first result combination is obtained by splicing the face feature sequence corresponding to the face detection result in the first result combination and the trunk feature sequence corresponding to the trunk detection result in the first result combination.

When associating the trunk detection result and the face detection result in a first result combination, the trunk feature sequence corresponding to the trunk detection result and the face feature sequence corresponding to the face detection result in the first result combination are spliced; the obtained slicing result is used as a first combination feature, and therefore, the first combination features have one-to-one correspondence with the first result combinations.

As can be understood, the trunk feature sequence and the face feature sequence can be connected end to end for splicing, and the obtained first combination feature is a one-dimensional feature sequence; and the trunk feature sequence and the face feature sequence can also be used as matrix elements, so as to be spliced to obtain a feature matrix; at this time, the first combination feature is the generated feature matrix. Certainly, other mode can also be used for splicing the trunk feature sequence and the face feature sequence to obtain the first combination feature; the embodiments of the present disclosure do not limit same herein.

In S1042b, the first combination feature corresponding to each first result combination is used for classifying each first result combination, to obtain the first sub-association result corresponding to each first result combination.

That is, a preset classification model for classifying the combination feature can be used for inputting the first combination feature corresponding to each first result combination into the preset classification model for classification, and the result output by the preset classification model is used as the first sub-association result.

It should be explained that the results output by the preset classification model only have two types, one is association, representing an association relation existing between the trunk and face in the first result combination, and the other one is non-association, representing no association relation existing between the trunk and face in the first result combination.

In some embodiments of the present disclosure, the results output by the preset classification model can be represented using specific numeral numbers, for example, 1 is used for representing an association relation existing between the trunk and face in the first result combination, and 0 is sued for representing no association relation existing between the trunk and face in the first result combination.

As can be understood, the preset classification model uses a large amount of combination feature sequences as training data; the association results of the combination feature sequences are used as a dichotomy model trained by a monitoring item. The preset classification model may be a multi-layer perceptron, and may also be other models; the embodiments of the present disclosure do not limit same herein.

In the embodiments of the present disclosure, the trunk feature sequence and the face feature sequence in each first result combination can be spliced to obtain the first combination feature corresponding to each first result combination, so as to classify the first result combination with the preset classification model according to the first combination feature, to obtain the first sub-association result corresponding to each first result combination. In this way, whether the trunk detection result is associated with the face detection result can be determined, to obtain the first sub-association result.

In some embodiments of the present disclosure, the trunk detection result of each second result combination is associated with the operational part detection result of said each second result combination according to the trunk feature sequence and the operational part feature sequence, to obtain a second sub-association result corresponding to each second result combination, i.e., the specific implementing process of S1043 may include: S1043a-S1043b, as follows.

In S1043a, for each of the at least one second result combination, a second combination feature corresponding to the second result combination is obtained by splicing the trunk feature sequence corresponding to the trunk detection result in the second result combination and the operational part feature sequence corresponding to the operational part detection result in the second result combination.

In actual applications, a mode of end to end splicing or a splicing matrix can be used for splicing the trunk feature sequence and the operational part feature sequence in a second result combination and using the obtained splicing result as the second combination feature corresponding to the second result combination. The aforementioned operations are performed on the trunk feature sequence and the operational part feature sequence in each second result combination to obtain the second combination feature corresponding to each second result combination.

It should be explained that the same mode for splicing the trunk feature sequence and the face feature sequence can be used for splicing the trunk feature sequence and the operational part feature sequence, and a different mode for splicing the trunk feature sequence and the face feature sequence can be used for splicing the trunk feature sequence and the operational part feature sequence.

In S1043b, Each second result combination is classified with the second combination feature corresponding to each second result combination, to obtain the second sub-association result corresponding to each second result combination.

Then the second combination feature is input into the preset classification model for classification and calculation, and the calculation result output by the preset classification model is used as the second sub-association result corresponding to the second result combination; in this way, the association process of the trunk detection result and the operational part detection result in the second result combination is completed.

In the embodiments of the present disclosure, the trunk feature sequence and the operational part feature sequence in each second result combination can be spliced to obtain a second combination feature, and the preset classification model is used for classifying the second combination feature to obtain the second sub-association result corresponding to each second result combination; in this way, whether the trunk detection result is associated with the operational part detection result in the second result combination can be determined.

Figure 4:
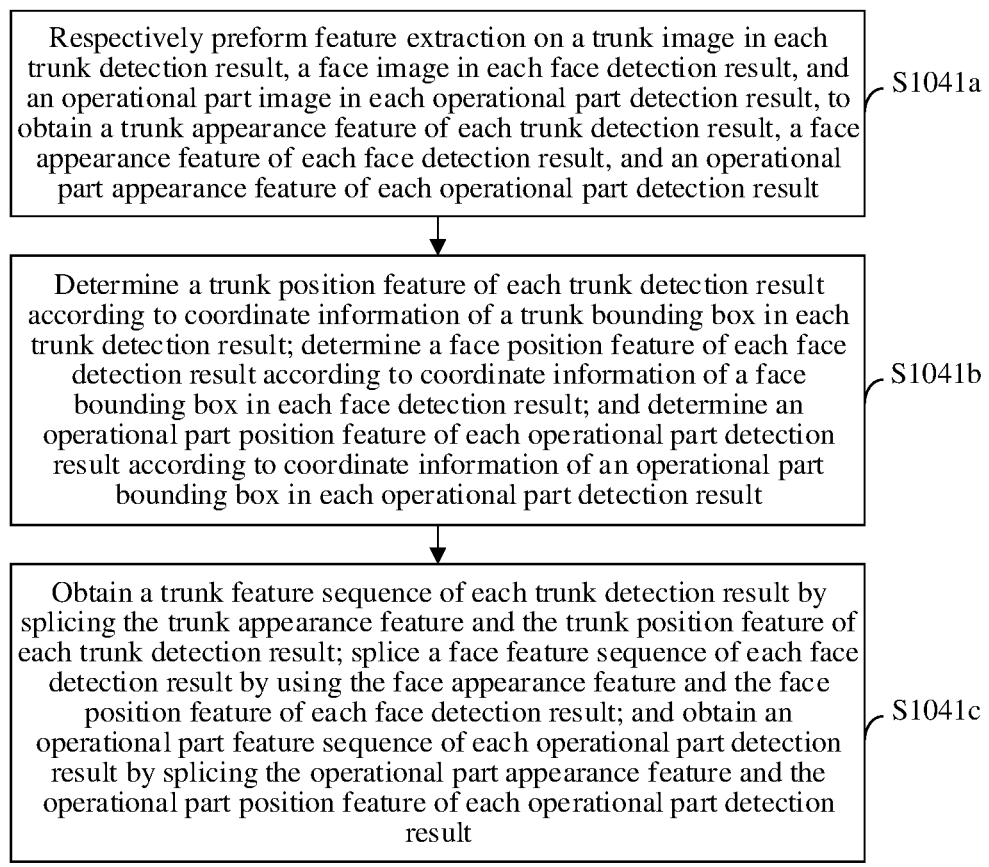
FIG. 4 is an optional flow chart III of the image recognition method provided by the embodiments of the present disclosure.

With reference to FIG. 4, FIG. 4 is an optional flow chart III of the image recognition method provided by the embodiments of the present disclosure. In same embodiments of the present disclosure, feature extraction is performed on each trunk detection result, each face detection result, and each operational part detection result, respectively, to obtain the trunk feature sequence corresponding to each trunk detection result, the face feature sequence corresponding to each face detection result, the operational part feature sequence corresponding to each operational part detection result, i.e., the specific implementing process of S1041 may include S1041a-S1041c, as follow:

In S1041a, feature extraction is respectively performed on a trunk image in each trunk detection result, a face image in each face detection result and an operational part image in each operational part detection result, to obtain a trunk appearance feature of each trunk detection result, a face appearance feature of each face detection result, and an operational part appearance feature of each operational part detection result.

When feature extraction is performed on each trunk detection result, each face detection result, and each operational part detection result, first, trunk images in each trunk detection result are captured, face images in each face detection result are captured, and operational part images in each operational part detection result are captured; then feature extraction is performed on these trunk images, face images, and operational part images, to respectively obtain a trunk appearance feature corresponding to the trunk images, a face appearance feature corresponding to the face images, an operational part appearance feature corresponding to the operational part images.

As can be understood, in the embodiments of the present disclosure, the trunk appearance feature, face appearance feature, and operational part appearance feature can be respectively obtained directly from the feature map of the image to be recognized; other appearance feature extraction algorithms can further be used for respectively obtain the trunk appearance feature, face appearance feature, and operational part appearance feature from the trunk images, face images, and operational part images. The specific method for obtaining the appearance feature can be set according to actual conditions, and the embodiments of the present disclosure do not limit same.

It should be explained that in the embodiments of the present application, feature extraction is performed on the trunk image in each trunk detection result, the face image in each face detection result, and the operational part image in each operational part detection result, and therefore, the number of the obtained trunk appearance features is the same as that of the trunk detection results; similarly, the number of the face appearance features is the same as that of the face detection results and the number of the operational part appearance features is the same as that of the operational part detection results.

In the embodiments of the present disclosure, the obtained trunk appearance feature, face appearance feature, and operational part appearance feature can be one-dimensional feature vectors and may also be features in other forms; the embodiments of the present disclosure do not limit same herein.

In S1041b, a trunk position feature of each trunk detection result is determined according to coordinate information of a trunk bounding box in each trunk detection result; a face position feature of each face detection result is determined according to coordinate information of a face bounding box in each face detection result; and an operational part position feature of each operational part detection result is determined according to coordinate information of an operational part bounding box in each operational part detection result.

In the image to be recognized, coordinate information of the trunk bounding box in each trunk detection result is obtained, and then, according to the coordinate information of the trunk bounding box, the trunk position feature corresponding to each trunk detection result is constituted; similarly, coordinate information of the face bounding box in each face detection result and coordinate information of the operational part bounding box in each operational part detection result are obtained, and then, according to the coordinate information, the face position feature corresponding to each face detection result and the operational part position feature corresponding to each operational part detection result are constituted.

As can be understood, in the embodiments of the present disclosure, the number of the obtained trunk position features is the same as that of the trunk detection results, the number of the obtained face position features is the same as that of the face detection results, and the number of the obtained operational part position features is the same as that of the operational part detection results.

In some embodiments of the present disclosure, the position feature can be directly constituted using the coordinate information and the position feature can further be constituted by first using the coordinate information to calculate parameters such as the height, width, and area of the detection region, and using these parameters; the embodiments of the present disclosure do not limit same herein.

In S1041c, the trunk feature sequence of each trunk detection result is obtained by splicing the trunk appearance feature and the trunk position feature of each trunk detection result; the face feature sequence of each face detection result is obtained by splicing the face appearance feature and the face position feature of each face detection result; and the operational part feature sequence of each operational part detection result is obtained by splicing the operational part appearance feature and the operational part position feature of each operational part detection result.

Since the number of the trunk appearance features and the number of the trunk position features are both the same of the number of the trunk detection results, the number of the obtained trunk feature sequences is also necessarily the same as that of the trunk detection result; similarly, the number of the face feature sequences is the same as that of the face detection result and the number of the operational part feature sequences is also the same as that of the operational part detection result.

In the embodiments of the present disclosure, the trunk appearance feature of each trunk detection result, the face appearance feature of each face detection result, and the operational part appearance feature of each operational part detection result, can be respectively extracted; according to the coordinate information of the trunk bounding box of each trunk detection result, the coordinate information of the face bounding box of each face detection result, and the coordinate information of the operational part bounding box of each operational part detection result, the trunk position feature, face position feature, and operational part position feature are generated; the appearance features and position features are correspondingly spliced, to obtain the trunk feature sequence of each trunk detection result, the face feature sequence of each face detection result, and the operational part feature sequence of each operational part detection result; in this way, the feature extracting process for each trunk detection result, each face detection result, and each operational part result can be completed.

Figure 5:
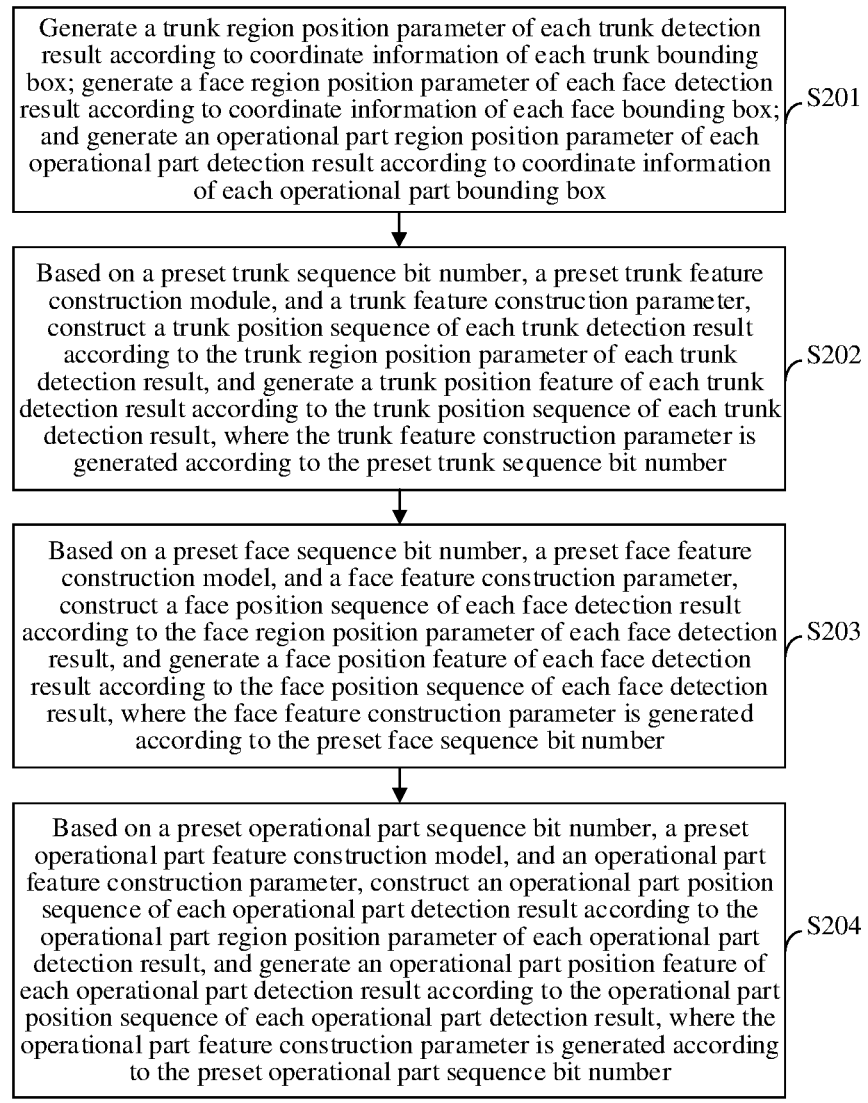
FIG. 5 is an optional flow chart IV of the image recognition method provided by the embodiments of the present disclosure.

With reference to FIG. 5, FIG. 5 is an optional flow chart IV of the image recognition method provided by the embodiments of the present disclosure. In some embodiments of the present disclosure, a trunk position feature of each trunk detection result is determined according to coordinate information of a trunk bounding box in each trunk detection result; a face position feature is determined according to coordinate information of a face bounding box in each face detection result; and an operational part position feature of each operational part detection result is determined according to an coordinate of an operational part bounding box in each operational part detection result, i.e., the specific implementing process of S1041b may include S201-S204, as follows.

In S201, a trunk region position parameter of each trunk detection result is generated according to the coordinate information of each trunk bounding box; a face region position parameter of each face detection result is generated according to the coordinate information of each face bounding box; and an operational part region position parameter of each operational part detection result is generated according to the coordinate information of each operational part bounding box.

In some embodiments of the present disclosure, the trunk region position parameter of a trunk detection result include: at least one of the coordinate information of the trunk bounding box in the trunk detection result and the width, height, and area of the trunk bounding box in the trunk detection result; the face region position parameter of a face detection result include: at least one of the coordinate information of the face bounding box in the face detection result and the width, height, and area of the face bounding box in the face detection result; and similarly, the operational part region position parameter of an operational part detection result include: at least one of the coordinate information of the operational part bounding box in the operational part detection result and the width, height, and area of the operational part bounding box in the operational part detection result.

Obtained four pieces of coordinate information of the trunk bounding box are then used for calculating the length, width, and area of the trunk bounding box; and from the length of the trunk bounding box, the width of the trunk bounding box, and the area of the trunk bounding box in the four pieces of coordinate information of the trunk bounding box, one or more parameters are selected as the position parameters for the trunk bounding box. Similarly, the face region position parameters and the operational part detection region position parameters can be obtained using the same mode as that for the trunk detection region position parameters.

In S202, based on a preset trunk sequence bit number, a preset trunk feature construction module, and a trunk feature construction parameter, a trunk position sequence of each trunk detection result is constructed according to the trunk region position parameter of each trunk detection result, and a trunk position feature of each trunk detection result is generated according to the trunk position sequence of each trunk detection result, where the trunk feature construction parameter is generated according to the preset trunk sequence bit number.

That is, the length of the trunk position sequence to be constructed can be determined according to the preset trunk sequence bit number, so as to further determine a trunk sub-construction parameter according to the length of the trunk position sequence, and then some bit number subscripts in the preset trunk sequence bit number are selected, for example, all even number bits, all odd number bits, etc., and then according to the bit number subscripts of these bit numbers and the sub-construction parameter, a trunk feature construction parameter is generated. Then the trunk feature construction parameter and the trunk feature construction model are used for constructing the trunk position feature of each trunk detection result, so as to splice the trunk position features to obtain the trunk position feature of each trunk detection result. The preset trunk sequence bit number refers to the bit number of the set trunk sequence subscripts.

It should be explained that in the embodiments of the present disclosure, the selected bit number subscripts can be used for comparing with the trunk sub-construction parameter to obtain the bit number subscript ratio; then the bit number subscript ratio is used as an index, and the multiple of the trunk construction parameter is used as a cardinal number, for an exponent operation; and then the result of the exponent operation is used as the trunk feature construction parameter.

Exemplarily, embodiments of the present disclosure provide a formula for constructing the trunk feature construction parameter, as shown in formula (1):

$$\sigma = na^{2i/a} \qquad (1)$$

where n is the multiple, and can be set according to actual conditions, a is the trunk sub-construction parameter, 2i is the even number bits in the preset trunk sequence bit number, and σ is the trunk feature construction parameter. After the image recognition apparatus obtains the preset trunk sequence bit number, and determines the length of the trunk position sequence, according to the length of the trunk position sequence, the trunk sub-construction parameter a can be determined, all even number bit subscripts in the preset trunk sequence bit numbers are obtained, and then these parameters are introduced into formula (1) so as to obtain the trunk feature construction parameter.

As can be understood, in the embodiments of the present disclosure, the preset trunk sequence bit number may be determined according to actual conditions, and the embodiments of the present disclosure do not limit same herein. Exemplarily, the preset trunk sequence bit number may be 0, 1, 2, ..., 255, and at this time, 256 subscripts are included in total; the preset trunk sequence bit number may also be 1, 2, ..., 128, and at this time, 128 subscripts are included in total;

It should be explained that when the image recognition apparatus obtains the preset trunk sequence bit number, the length of the trunk position sequence to be constructed is also actually determined. The constructed position sequence length is associated with the last subscript of the preset trunk sequence bit number. In the embodiments of the present disclosure, when the bit number of the sequence subscripts may be started from 0, the length of the trunk position sequence is the last subscript −1 of the preset sequence bit number, and when the bit number of the sequence subscripts may also be started from 1, the length of the trunk position sequence is the same as the last subscript of the preset sequence bit number. Moreover, after the length of the trunk position sequence is determined, the trunk sub-construction parameter in the trunk feature construction parameter is also determined.

In some embodiments of the present disclosure, the trunk sub-construction parameter in the trunk feature construction parameter is the same as the trunk position sequence in length, for example, when the length of the trunk position sequence is 256, the trunk sub-construction parameter is also 256; the trunk sub-construction parameter in the trunk feature construction parameter may also be a half of the trunk position sequence length, for example, when the trunk position sequence length is 256, the trunk sub-construction parameter is 128; the embodiments of the present disclosure do not limit same herein.

It should be explained that since the trunk region position parameter includes at least one of the coordinate, length, width, and area of the trunk bounding box, and since the position sequence is constructed for each trunk region position parameter, the number of the position sequences is also the same as that of the region position parameters.

Exemplarily, when only using four coordinates (which may be coordinates of four corners of the trunk bounding box) of the trunk detection region as the trunk region position parameters, four position sequences for one trunk detection region can be obtained; moreover, the four position sequences have one-to-one correspondence to the four coordinates; when using four coordinates and the height, width, and area together as the trunk region position parameters, seven trunk position sequences for one trunk detection region can be obtained; moreover, the seven position sequences respectively correspond to the four coordinates and the height, width, and area.

It should be understood that the preset trunk feature construction model is used for constructing a position element for each subscript bit number in the preset trunk sequence bit number; the preset trunk feature construction model may be a cosine construction model, may also be a sine construction model, and may further be other construction models. The embodiments of the present disclosure do not limit same herein.

Since the number of the trunk position sequences is the same as that of the trunk region position parameters, when only one parameter exists in the trunk region position parameters, only one trunk position sequence also exists; at this time, the trunk position sequence can be directly used as the trunk position feature; and when the trunk region position parameters have multiple parameters, multiple trunk position sequences would exist, and at this time, the multiple trunk position sequences can be connected end to end so as to be spliced to obtain the trunk position feature.

It should be understood that since one or more trunk position sequences are obtained, the length of the trunk position feature is the product of the length of the trunk position sequence and the number of the position sequences.

In S203, based on a preset face sequence bit number, a preset face feature construction model, and a face feature construction parameter, a face position sequence of each face detection result is constructed according to the face region position parameter of each face detection result, and a face position feature of each face detection result is generated according to the face position sequence of each face detection result, where the face feature construction parameter is generated according to the preset face sequence bit number.

In S204, based on a preset operational part sequence bit number, a preset operational part feature construction model, and an operational part feature construction parameter, an operational part position sequence of each operational part detection result is constructed according to the operational part region position parameter of each operational part detection result, and an operational part position feature of each operational part detection result is generated according to the operational part position sequence of each operational part detection result, where the operational part feature construction parameter is generated according to the preset operational part sequence bit number.

A mode similar to S201 can be used for obtaining the face position feature of each face detection result and the operational part position feature of each operational part detection result. It should be explained that the preset trunk sequence bit number, the preset face sequence bit number, and the preset operational part sequence bit number may be the same or may also be different; the embodiments of the present disclosure do not limit same herein.

In the embodiments of the present disclosure, respectively according to the coordinate information of the trunk bounding box, the coordinate information of the face bounding box, and the coordinate information of the operational part bounding box, the trunk region position parameter, the face region position parameter, and the operational part region position parameter, can be respectively generated; and based on the position parameters, the preset sequence bit number, the preset feature construction models, and the generated feature construction parameters, the trunk position sequence, the face position sequence, and the operational part position sequence are obtained, so as to obtain the trunk position feature, the face position feature, and the operational part position feature. In this way, the generation of the trunk position feature, the face position feature, and the operational part position feature can be completed.

In some embodiments of the present disclosure, when a preset sequence bit number is an even number bit and the preset feature construction model is a sine construction model, the position sequence is determined by S205-S208, as follows.

In S205, the region position parameter of each detection result is divided by the feature construction parameter, to obtain a first parameter ratio of each detection result.

Exemplarily, the embodiments of the present disclosure provide a process for generating the first parameter ratio, as shown in formula (2):

$$h = \frac{p}{\sigma} \qquad (2)$$

where p is the region position parameter, σ is the calculated feature construction parameter, and h is the first parameter ratio. After obtaining the region position parameter of each detection result and calculating the feature construction parameter, these parameters can be introduced into formula (2), to respectively obtain the first parameter ratio of each detection result.

It should be explained that since the region position parameter of the detection result includes at least one of the coordinate, length, width, and area of the detection region, one or more or the first parameter ratios of the detection result can be respectively determined. Moreover, the first parameter ratios all correspond to the region position parameters.

In S206, sine value calculation is performed on the first parameter ratio of each detection result using the sine construction model, to obtain a first position element.

After the first parameter ratio is obtained, construction of the position element can be performed on each bit number subscript in the preset sequence bit number. In the embodiments of the present disclosure, when the number of the position subscripts is an even number, i.e., the preset sequence bit number is the even number bit, the first parameter ratio can be introduced into the sine construction model for calculation of a sine value, and the obtained sine value is marked as the first position element. In this way, the calculation of the first position elements of all even number bits in the preset sequence bit number is completed.

Exemplarily, the embodiments of the present disclosure provide a process for calculating the first position elements of the even number bits, as shown in formula (3):

$$PE_{2i} = \sinh \qquad (3)$$

where h is the first parameter ratio, 2i is the even number bit in the preset sequence bit number, and $PE_{2i}$ is the calculated first position element. After the first parameter ratio is obtained, the first parameter ratio can be introduced into formula (3) for calculating the first position element.

It should be explained that the first position element refers to the position element on the even number bit; multiple even number bits may exist in the present sequence bit number, and therefore, the first position element does not specify a certain element, rather than making a general reference to the first position elements on all even number bits.

In S207, the position sequence of each detection result is determined according to the first position element of each detection result.

For one detection result, after obtaining the first position elements of the detection result, all of the first elements of the detection result are arranged and integrated according to the order of the bit number subscripts; and the integration result is used as the position sequence of the detection result.

In S208, when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence; when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

In the embodiments of the present disclosure, the sine construction model can be used for generating the first position elements for the even number bit in the sequence bit number, and the first position elements are used for obtaining the position sequence, so as to obtain the position feature. In this way, the mode for obtaining the position sequence can be used for constructing the trunk position feature, the face position feature, and the operational part position feature.

In some embodiments of the present disclosure, when a preset sequence bit number is an odd number bit and a preset feature construction model is a cosine construction model, the position sequence is determined by S209-S212, as follows.

In S209, the region position parameter of each detection result is divided by the feature construction parameter, to obtain a second parameter ratio of each detection result.

In S210, cosine value calculation is performed on the second parameter ratio of each detection result using the cosine construction model, to obtain a second position element.

When the number of the bit number subscripts is an odd number, i.e., the preset sequence bit number is the odd number bit, the first parameter ratio can be introduced into the cosine construction model for calculation, and the obtained cosine value is separately marked as the second position element.

Exemplarily, the embodiments of the present disclosure provide a process for calculating the second position elements of the odd bits, as shown in formula (4):

$$PE_{2i+1} = \cosh \quad (4)$$

where h is the first parameter ratio, 2i+1 is the odd number bit in the preset sequence bit number, and $PE_{2i+1}$ is the calculated second position element. The second parameter ratio can be introduced into formula (4) for calculating the second position element.

As can be understood, similar to the first position element, the second position element does not specify a certain trunk position element rather than making a general reference to the position elements on all odd number bits.

In S211, the position sequence of each detection result is determined according to the second position element of each detection result.

In S212, when the preset sequence bit number is the preset trunk sequence bit number, then the preset feature construction model is the preset trunk feature construction model, the feature construction parameter is the preset trunk feature construction parameter, the detection result is the trunk detection result, the region position parameter is the trunk region position parameter, and the position sequence is the trunk position sequence; when the preset sequence bit number is the preset face sequence bit number, then the preset feature construction model is the preset face feature construction model, the feature construction parameter is the preset face feature construction parameter, the detection result is the face detection result, the region position parameter is the face region position parameter, and the position sequence is the face position sequence; and when the preset sequence bit number is the preset operational part sequence bit number, then the preset feature construction model is the preset operational part feature construction model, the feature construction parameter is the preset operational part feature construction parameter, the detection result is the operational part detection result, the region position parameter is the operational part region position parameter, and the position sequence is the operational part position sequence.

In the embodiments of the present disclosure, the cosine construction model can be used for generating the second position elements for the odd number bit in the sequence bit number, and the second position elements are used for obtaining the position sequence. In this way, the mode for obtaining the position sequence can be used by the image recognition apparatus for constructing the trunk position feature, the face position feature, and the operational part position feature.

In some embodiments of the present disclosure, a trunk region position parameter of each trunk detection result is generated according to the coordinate information of each trunk bounding box; a face region position parameter of each face detection result is generated according to the coordinate information of each face bounding box; and an operational part region position parameter of each operational part detection result is generated according to the coordinate information of each operational part bounding box, i.e., the specific implementing process of S201 may include S2011-S2014, as follows.

In S2011, according to the coordinate information of the trunk bounding box in each trunk detection result, the width, height, and area of the trunk bounding box in each trunk detection result are calculated; and according to the coordinate information of the face bounding box in each face detection result, the width, height, and area of the face bounding box in each face detection result are calculated; according to the coordinate information of the operational part bounding box in each operational part detection result, the width, height, and area of the operational part bounding box in each operational part detection result are calculated.

The horizontal axis coordinate at the left upper corner of the trunk bounding box is used for making a difference with the horizontal axis at the right upper corner of the trunk bounding box, and the obtained difference is used as the width of the trunk bounding box; the longitudinal axis coordinate at the left lower corner of the trunk bounding box is used for making a difference with the longitudinal axis at the left upper corner of the trunk bounding box, and the obtained difference is used as the height of the trunk bounding box; finally, the product of the width and the height is calculated to obtain the area of the trunk bounding box. Meanwhile, the same method for calculating the width of the trunk bounding box can also be used for respectively calculating the width of the face bounding box and the width of the operational part bounding box; the same method for calculating the height of the trunk bounding box can also be used for respectively calculating the height of the face bounding box and the height of the operational part bounding box, and the same method for calculating the area of the trunk bounding box can also be used for respectively calculating the area of the face bounding box and the area of the operational part bounding box.

Figure 6:
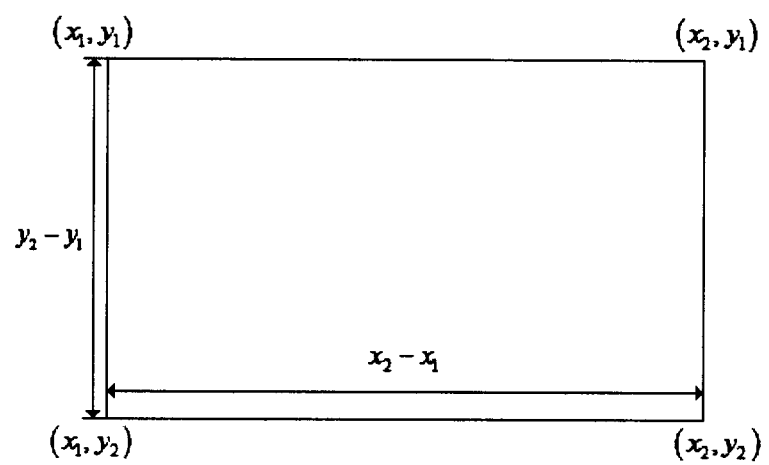
FIG. 6 is a schematic diagram of width, height, and area of a trunk detection region provided by the embodiments of the present disclosure.

Exemplarily, the present disclosure provides the schematic diagram of the width, height, and area of the trunk bounding box, as shown in FIG. 6, $(x_1, y_1)$ is the coordinate at the left upper corner of the trunk bounding box, $(x_2, y_1)$ is the coordinate at the right upper corner of the trunk bounding box, $(x_1, y_2)$ is the coordinate at the left lower corner of the trunk bounding box, and $(x_2, y_2)$ is the coordinate at the right lower corner of the trunk bounding box. At this time, the width of the trunk bounding box is $x_2-x_1$, the height of the trunk bounding box is $y_2-y_1$, and accordingly, the area of the trunk bounding box is $(x_2-x_1) \times (y_2-y_1)$.

In S2012, at least one of the coordinate information, width, height, and area of the trunk bounding box in each trunk detection result is used for constructing the trunk region position parameter of each trunk detection result.

After obtaining the four coordinates of the trunk bounding box, the width of the trunk bounding box, the height of the trunk bounding box, and the area of the trunk bounding box, one or more parameters can be selected from these parameters as the trunk region position parameters; in this way, the image recognition apparatus obtains the trunk region position parameters of each trunk detection result.

In S2013, at least one of the coordinate information, width, height, and area of the face bounding box in each face detection result is used for constructing the face region position parameter of each face detection result.

Similarly, after obtaining the four coordinates of the face bounding box, the width of the face bounding box, the height of the face bounding box, and the area of the face bounding box, one or more parameters can be selected from these parameters as the face region position parameters of each face detection result.

In S2014, at least one of the coordinate information, width, height, and area of the operational part bounding box in each operational part detection result is used for constructing the operational part region position parameter of each operational part detection result.

Similarly, one or more parameters of the four coordinates of the operational part bounding box, the width of the operational part bounding box, the height of the operational part bounding box, and the area of the operational part bounding box are used as the operational part region position parameters of each operational part detection result.

In embodiments of the present disclosure, the coordinate information of the trunk bounding box, the coordinate information of the face bounding box, and the coordinate information of the operational part bounding box are respectively used for obtaining the trunk detection region position parameter, the face detection region position parameter, and the operational part detection region position parameter; in this way, these position parameters can be subsequently used for obtaining the position sequence.

Figure 7:
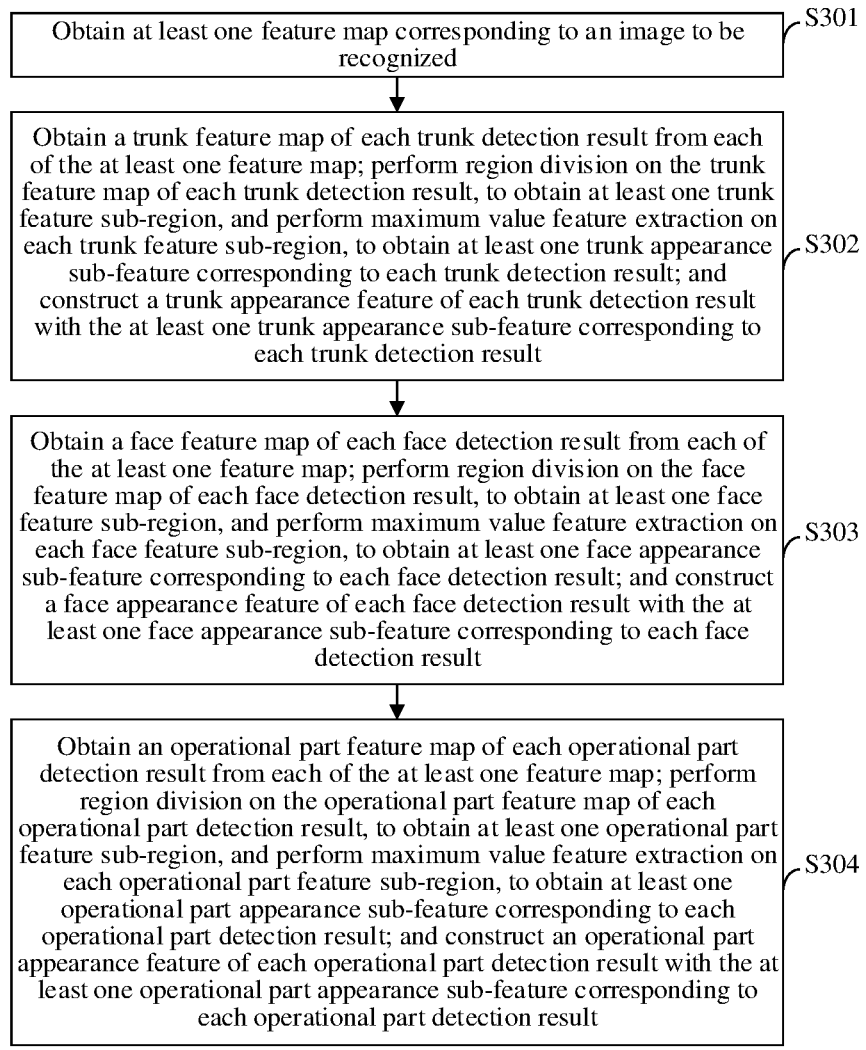
FIG. 7 is an optional flow chart V of the image recognition method provided by the embodiments of the present disclosure.

With reference FIG. 7, FIG. 7 is an optional flow chart V of the image recognition method provided by the embodiments of the present disclosure. In some embodiments of the present disclosure, the appearance feature extraction is respectively performed on the trunk image in each trunk detection result, the face image in each face detection result, and the operational part image in each operational part detection result, to obtain the trunk appearance feature of each trunk detection result, the face appearance feature of each face detection result, and the operational part appearance feature of each operational part detection result, i.e., the specific implementing process of S1041a may include: S301-S304, as follows.

In S301, at least one feature map corresponding to the image to be recognized is obtained.

During feature extraction, it requires to extract the feature map generated during performing the region detection on the image to be recognized, so as to facilitate direct appearance feature extraction from the feature map. It should be explained that since during performing image detection by means of the image recognition apparatus, the image to be recognized would be input into multiple different channels for a convolution operation, where one channel corresponding to one convolution kernel, and one feature map may be obtained from one convolution kernel. Therefore, the image recognition apparatus may obtain at least one feature map in total; the number of the feature maps is the same as that of the channels.

Exemplarily, when the image recognition apparatus separately transmits the image to be recognized into 64 channels for the convolution operation, the image recognition apparatus may obtain 64 feature maps at this time.

In S302, a trunk feature map of each trunk detection result is obtained from each of the at least one feature map; region division is performed on the trunk feature map of each trunk detection result, to obtain at least one trunk feature sub-region, and performing maximum value feature extraction on each trunk feature sub-region, to obtain at least one trunk appearance sub-feature corresponding to each trunk detection result; and the at least one trunk appearance sub-feature corresponding to each trunk detection result is used for constructing a trunk appearance feature of each trunk detection result.

That is, in each feature map, the image content corresponding to the trunk image of each trunk detection result is respectively obtained to obtain the trunk feature map of each trunk detection result. The trunk feature map is separately divided into multiple trunk feature sub-regions according to a preset sub-region division rule. Since one or more feature pixels may exist in the trunk feature sub-region, the maximum feature pixel can be extracted from these feature pixels as a trunk appearance sub-feature corresponding to the trunk sub-region, so as to obtain at least one trunk appearance sub-feature corresponding to each trunk detection result. When obtaining one trunk appearance sub-feature, the trunk appearance sub-feature can be directly used as the trunk appearance feature. When respectively obtaining multiple trunk appearance sub-features, each of the multiple trunk appearance sub-features can be spliced into the trunk appearance feature by means of end-to-end connection.

As can be understood that since the feature map is obtained after convolution of the image to be recognized, the size of the feature map is different from that of the image to be recognized. Therefore, size variation can be performed on the coordinate information of the trunk bounding box, to obtain the coordinate information of the trunk mapping box, so as to obtain the image content selected by means of a box from the trunk mapping box according to the coordinate information of the trunk mapping box, and to use the partial content as the trunk feature map.

It should be explained that, after size variation is performed on the coordinate information of the trunk bounding box, the obtained coordinate information of the trunk mapping box may be the number of floating points; at this time, the coordinate information of the number of the floating points can be directly used for obtaining the trunk feature map, and the coordinate information of the number of the floating points can also be converted as the coordinate information of an integer, so as to further obtain the trunk feature map.

It should be explained that, in some embodiments of the present disclosure, the trunk sub-region can also be continuously divided, to obtain the division result of the trunk sub-region, and obtain the feature pixel at the middle position of the division result; then the feature pixels of the middle positions are compared and the feature pixel of the maximum middle position is used as the trunk appearance sub-feature corresponding to the trunk sub-region. Herein, since the coordinate information of the trunk sub-region may be the number of the floating points, so that the middle position of the division result may also be a floating point number, that is, the feature pixel corresponding to the middle position of the division result cannot be directly found in the feature map; at this time, the image recognition apparatus may use a bilinear difference method, to calculate the feature pixel of the middle position of the division result according to the feature pixel having a closer distance to the middle position of the division result, so as to obtain the trunk appearance sub-feature.

In S303, a face feature map of each face detection result is obtained from each of the at least one feature map; region division is performed on the face feature map of each face detection result, to obtain at least one face feature sub-region, and performing maximum value feature extraction on each face feature sub-region, to obtain at least one face appearance sub-feature corresponding to each face detection result; and the at least one face appearance sub-feature corresponding to each face detection result is used for constructing a face appearance feature of each face detection result.

In S304, an operational part feature map of each operational part detection result is obtained from each of the at least one feature map; region division is performed on the operational part feature map of each operational part detection result, to obtain at least one operational part feature sub-region, and maximum value feature extraction is performed on each operational part feature sub-region, to obtain at least one operational part appearance sub-feature corresponding to each operational part detection result; and the at least one operational part appearance sub-feature corresponding to each operational part detection result is used for constructing an operational part appearance feature of each operational part detection result.

It should be explained that the implementing processes of S303 and S304 are quite similar to the implementing process of S302; details are omitted in the embodiments of the present disclosure.

In the embodiments of the present disclosure, the trunk appearance feature corresponding to the trunk image of each trunk detection result, the face appearance feature corresponding to the face image of each face detection result, and the operational part appearance feature corresponding to the operational part image of each operational part detection result can be obtained from the feature map, so as to respectively obtain the trunk feature sequence, the face feature sequence, and the operational part feature sequence.

In some embodiments of the present disclosure, image detection is performed on the image to be recognized to obtain at least one trunk detection result, at least one face detection result, and at least one operational part detection result, i.e., the specific implementing process of S101 may include: S1011-S1014, as follows.

In S1011, at least one candidate bounding box is generated for the image to be recognized according to the present detection region generation rule.

When image detection is performed on the image to be recognized, first, according to the preset detection region generation rule stored in advance, multiple candidate bounding boxes are generated for the image to be recognized; in this way, it can be seen as that the image recognition apparatus divides the image to be recognized into multiple image blocks with different sizes.

As can be understood, the preset detection region generation rule may refer to performing dimension variation on an initial bounding box, to obtain multiple bounding box rules, and may also refer to other bounding box generation rules, for example, slide window generation, etc.; the embodiments of the present disclosure do not make any specific definition herein.

In S1012, for the image selected by means of a box from each candidate bounding box in the at least one candidate bounding box, the trunk probability is calculated; according to the trunk probability and the preset overlapping degree threshold, at least one trunk bounding box is selected from the at least one candidate bounding box, so as to obtain at least one trunk detection result.

The image content in each candidate bounding box is extracted, and the detection model stored in advance is used for respectively recognizing each image content to obtain the probability of each image content being the trunk image, respectively, i.e., the trunk probability. According to the trunk probability of each image content and by combining the preset overlapping degree threshold, the trunk bounding box is found in all candidate bounding boxes and constitutes the trunk detection result together with the trunk image in the trunk bounding box, to obtain the at least one trunk detection result.

In S1013, for the image selected by means of a box from each candidate bounding box in the at least one candidate bounding box, the face probability is calculated; according to the face probability and the preset overlapping degree threshold, at least one face bounding box is selected from the at least one candidate bounding box, so as to obtain at least one face detection result.

In S1014, for the image selected by means of a box from each candidate bounding box in the at least one candidate bounding box, the operational part probability is calculated; according to the operational part probability and the preset overlapping degree threshold, at least one operational part bounding box is selected from the at least one candidate bounding box, so as to obtain at least one operational part detection result.

As can be understood that since the preset overlapping degree threshold is used for selecting a bounding box from multiple bounding boxes with a closer distance, i.e., the obtained at least one trunk bounding box is subjected to the bounding box removal operation, the number of the candidate bounding boxes is greater than or equal to the sum of the number of the trunk detection results, the number of the face detection results, and the number of the operational part detection results.

In the embodiments of the present disclosure, the image contents selected by means of a box from all candidate bounding boxes in the image to be recognized are recognized, to obtain the trunk probability, the face probability, and the operational part probability, thereby obtaining at least one trunk detection result, at least one face detection result, and at least one operational part detection result according to the probabilities; in this way, the at least one trunk detection result, the at least one face detection result, and the at least one operational part detection result can be subsequently combined.

In some embodiments of the present disclosure, the preset detection region generation rule in S1011 may include: S1011a-S1011b, as follows In S1011a, according to a preset initial size, an initial bounding box is generated.

In S1011b, dimension conversion and stretching conversion are performed on the initial bounding box, to obtain at least one candidate bounding box.

That is, first the bounding box with the preset initial size is generated, and the bounding box is used as the initial bounding box; then the dimension of the initial bounding box is converted, to obtain multiple candidate bounding boxes; meanwhile, under the condition that the area of the initial bounding box is maintained unchanged, the width and height of the initial bounding box is stretched, to continuously obtain the candidate bounding boxes; in this way, the at least one candidate bounding box can be further obtained according to the preset bounding box generation rule.

In the embodiments of the present disclosure, the initial bounding box can be generated according to the preset initial size; then the initial bounding box is converted to obtain the at least one candidate bounding box; in this way, the image recognition apparatus can select the image content by means of a box from the at least one candidate bounding box and calculate the trunk probability, the face probability, and the operational part probability of the image content, so as to obtain the at least one trunk detection result, the at least one face detection result, and the at least one operational part detection result.

In some embodiments of the present disclosure, according to the trunk probability, the face probability, the operational part probability, and the preset overlapping degree threshold, the at least one trunk bounding box, the at least one face bounding box, and the at least one operational part bounding box, are selected from the at least one candidate bounding box, so as to obtain at least one trunk detection result, at least one face detection result, and at least one operational part detection result, i.e., the specific implementing process of S1013 may include: S1013a-S1013g, as follows.

In S1013a, according to the trunk probability, the face probability, and the operational part probability, the at least one temporary trunk detection region, the at least one temporary face detection region, and the at least one temporary operational part detection region, are respectively selected from the at least one candidate bounding box.

Since each candidate bounding box corresponds to three probabilities, i.e., the trunk probability, the face probability, and the operational part probability, at this time, the trunk probability, the face probability, and the operational part probability of each candidate bounding box may be compared; if the trunk probability is the greatest, the candidate bounding box is the temporary trunk bounding box; if the face probability is the greatest, the candidate bounding box is the temporary face bounding box; and if the operational part probability is the greatest, the candidate bounding box is the temporary operational part bounding box. In this way, after the comparison among the trunk probability, the face probability, and the operational part probability of each candidate bounding box is completed, the at least one temporary trunk bounding box, the at least one temporary face bounding box, and the at least one temporary operational part bounding box can be obtained.

In S1013b, the temporary trunk bounding box with the trunk probability as the greatest is used as a first trunk bounding box; the first trunk bounding box and the trunk image selected from the first trunk bounding box by means of a box are used for constituting a first trunk detection result; from the at least one temporary trunk bounding box, the temporary trunk bounding box having an overlapping degree with the first trunk bounding box exceeding the preset overlapping degree threshold is removed, to obtain the at least one intermediate trunk bounding box; the at least one intermediate trunk bounding box is used as the at least one temporary trunk bounding box, for continuously executing the process above, until the at least one trunk detection result is obtained.

That is, the trunk probabilities of all temporary trunk bounding boxes can be compared to select the temporary trunk bounding box with the trunk probability being the greatest, as the first trunk bounding box; meanwhile, the first trunk bounding box and the trunk image selected from the first trunk bounding box by means of a box are used for constituting the first trunk detection result; at this time, the image recognition apparatus mat obtain a trunk detection result. The image recognition apparatus calculate the overlapping degree of the first trunk bounding box and the other temporary bounding boxes in the at least one temporary trunk bounding box; when the overlapping degree exceeds the present overlapping degree threshold, the image recognition apparatus considers the temporary bounding box is similar to the first trunk bounding box; the trunk image selected by means of a box may have a higher overlapping degree as the trunk image selected by means of a box by the first trunk bounding box; at this time, the temporary bounding box may be removed. After the removing work of all temporary trunk bounding boxes with the overlapping degree exceeding the preset overlapping degree threshold, the at least one intermediate trunk bounding box can be obtained.

After executing the process above, one trunk detection result is obtained and the bounding box closer to the trunk bounding box in distance is removed; at this time, the at least one intermediate bounding box is used as the temporary bounding box, for continuing the process above; by means of repeated circulations, at least one trunk detection result can be obtained.

In S1013c, the temporary face bounding box with the face probability as the greatest is used as a first face bounding box; the first face bounding box and the face image selected from the first face bounding box by means of a box are used for constituting a first face detection result; from the at least one temporary face bounding box, the temporary face bounding box having an overlapping degree with the first face bounding box exceeding the preset overlapping degree threshold is removed, to obtain the at least one intermediate face bounding box; the at least one intermediate face bounding box is used as the at least one temporary face bounding box, for continuously executing the process above, until the at least one face detection result is obtained.

In S1013d, the temporary operational part bounding box with the operational part probability as the greatest is used as a first operational part bounding box; the first operational part bounding box and the operational part image selected from the first operational part bounding box by means of a box are used for constituting a first operational part detection result; from the at least one temporary operational part bounding box, the temporary operational part bounding box having an overlapping degree with the first operational part bounding box exceeding the preset overlapping degree threshold is removed, to obtain the at least one intermediate operational part bounding box; the at least one intermediate operational part bounding box is used as the at least one temporary operational part bounding box, for continuously executing the process above, until the at least one operational part detection result is obtained.

It should be explained that the implementing processes of S1013c and S1013d are quite similar to the implementing process of S1013b; details are omitted in the embodiments of the present disclosure.

In the embodiments of the present disclosure, first the first trunk bounding box can be selected from the at least one temporary trunk bounding box, so as to obtain the first trunk detection result; the first face bounding box can be selected from the at least one temporary face bounding box, so as to obtain the first face detection result; and the first operational part bounding box can be selected from the at least one temporary operational part bounding box, so as to obtain the first operational part detection result; the bounding boxes closer to the first trunk bounding box, the first face bounding box, and the first operational part bounding box are respectively deleted; by means of repeated circulations, at least one trunk detection result, at least one face detection result, and at least one operational part detection result can be obtained.

Then, taking the image recognition process of the actual application scene as an example, the image recognition method provided in the embodiments of the preset disclosure is explained. The embodiments of the present disclosure take the actual application scene provided in FIG. 1 as an example to explain the processes included by the image recognition method.

In S401, a convolutional neural network model is used for detecting the trunk detection result, the face detection result, and the operational part detection result in the image of the actual application scene.

It should be explained that at this time, the relation among the trunk, face and operational part is unknown.

In S402, the 64 feature maps of the image of the actual application scene are obtained.

In S403, the trunk image, face image, and operational part image obtained in S401 are mapped into the 64 feature maps, to obtain 64 trunk feature maps corresponding to the trunk image, 64 face feature maps corresponding to the face image, and 64 operational part feature maps corresponding to the operational part image.

In S404, each trunk feature map is divided into 49 trunk feature sub-regions; each face feature map is divided into 49 face feature sub-regions; and each operational part feature map is divided into 49 operational part feature sub-regions.

The image recognition apparatus may obtain in total 64×49=3136 trunk feature sub-regions, 64×49=3136 face feature sub-regions, and 64×49=3136 operational part feature sub-regions.

In S405, the trunk appearance sub-feature of each trunk feature sub-region, the face appearance sub-feature of each face feature sub-region, and the operational part appearance sub-feature of each operational part feature sub-region, are respectively extracted.

The image recognition apparatus extracts one appearance sub-feature for one feature sub-region; in this way, 3136 trunk appearance sub-features, 3136 face appearance sub-features, and 3136 operational part appearance sub-features can be obtained.

In S405, the trunk appearance feature, the face appearance feature, and the operational appearance feature are respectively obtained according to the trunk appearance sub-feature, the face appearance sub-feature, and the operational part appearance sub-feature.

In actual applications, each appearance sub-feature is quantized as within 0-9; in this way, the obtained trunk appearance feature, the face appearance feature, and the operational part appearance feature are all one dimensional feature vector with the length of 3136.

In S406, the coordinates of the trunk detection region, the face detection region, and the operational part detection region are used for respectively calculating the width, height, and area of the trunk detection region, the width, height, and area of the face detection region, and the width, height, and area of the operational part detection region, respectively.

If the coordinate of one detection region is (x1, y1, x2, y2), where x1 is the horizontal axis coordinate at the left upper corner of the detection region n, y1 is the longitudinal axis coordinate at the left upper corner of the detection region, x2 is the horizontal axis coordinate at the right lower corner of the detection region, and y2 is the longitudinal axis coordinate at the right lower corner of the detection region. Then according to the four coordinates, the width of the detection region x2−x1 is calculated, the height of the detection region y2−y1 is calculated, and the area of the detection region (x2−x2)×(y2−y1) is calculated. It should be explained that after obtaining the width and height, the image recognition apparatus may use the width for normalizing x1 and x2 and use the height for normalizing y1 and y2, so as to obtain the normalized coordinate; then the normalized coordinate is used for obtaining the normalized width, normalized height, and normalized area corresponding to the detection region by means of calculation.

In S407, the coordinate, width, height, and area of the trunk detection region are used as the trunk region position parameters, the coordinate, width, height, and area of the face detection region are used as the face region position parameters, and the coordinate, width, height, and area of the operational part detection region are used as the operational part region position parameters.

In S408, for each parameter in the trunk region position parameters, each parameter in the face region position parameters, and each parameter in the operational part region position parameters, the position sequence with the length of 256 is constructed.

0, 1, 2, . . . , 255 are selected as the preset sequence bit number, and the sequence with the length of 256 is constructed. where the preset feature construction models are respectively as shown in formula (5) and formula (6):

$$PE_{2i}=\sin(p/768^{2i/256}) \tag{5}$$

$$PE_{2i+1}=\cos(p/768^{2i/256}) \tag{6}$$

where p is the position parameter, 2i is the even number bit, $PE_{2i}$ is the position element at the even number bit, and $PE_{2i+1}$ is the position element at the odd number bit.

In S409, 256 position sequences for each parameter in the trunk region position parameters are spliced to obtain 1792 trunk position features, 256 position sequences for each parameter in the face region position parameters are spliced to obtain 1792 face position features, and 256 position sequences for each parameter in the operational part region position parameters are spliced to obtain 1792 operational part position features.

In S410, 1792 trunk position features and 3136 trunk appearance features are spliced, to obtain 4928 trunk feature sequences, 1792 face position features and 3136 face appearance features are spliced, to obtain 4928 face feature sequences, and 1792 operational part position features and 3136 operational part appearance features are spliced, to obtain 4928 operational part feature sequences.

In S411, at least one trunk detection result and at least one face detection result are combined in pairs, to obtain at least one first result combination; and at least one trunk detection result and at least one operational part detection result are combined in pairs, to obtain at least one second result combination.

In S412, 4928 trunk feature sequences and 4928 face feature sequences in each first result combination are spliced into a first combination feature with the length of 9856, and a multi-layer perceptron is used for performing dichotomy on the first combination feature, to obtain the first sub-association result corresponding to each first result combination.

That is, whether the trunk detection result and the face detection result in each first result combination belong to the same person is determined.

In S412, 4928 trunk feature sequences and 4928 operational part feature sequences in each second result combination are spliced into a second combination feature with the length of 9856, and a multi-layer perceptron is used for performing dichotomy on the second combination feature, to obtain the second sub-association result corresponding to each second result combination.

That is, whether the trunk detection result and the operational part detection result in each second result combination belong to the same person is determined.

In S414, the first sub-association result and the second sub-association result are used for determining whether the face detection result and the operational part detection result belong to the same person, to implement the image recognition process.

When the first sub-association result is that the trunk detection result and the face detection result belong to the same person, and the second sub-association result is that the trunk detection result and the operational part detection result belong to the same person, the face detection result is associated with the operational part detection result. In the remaining conditions, the face detection result is not associated with the operational part detection result.

By means of the modes above, the relation between the trunk detection result and the face detection result and the relation between the trunk detection result and the operational part detection result can be determined, so as to use the trunk detection result to associate the face detection result with the operational part detection result, which lowers the difficulty for determining the face and the operational part, would not lose key information of a body in the image at the same time, and improves the accuracy of the association between the face and the operational part.

Figure 8:
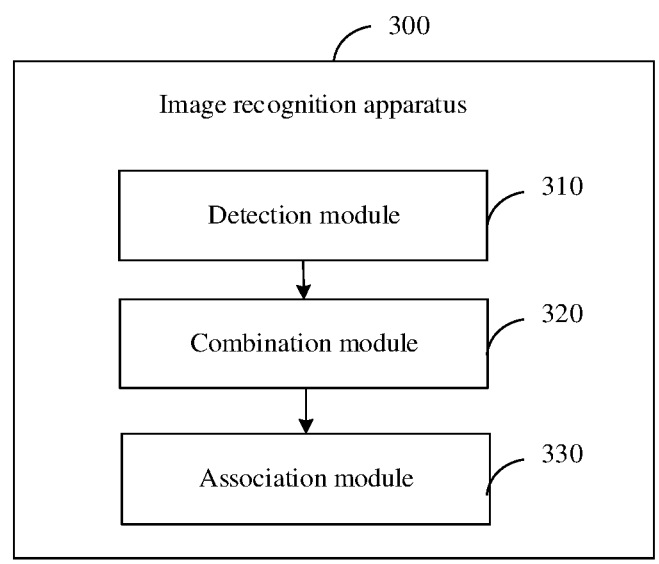
FIG. 8 is a schematic structural diagram I of the image recognition apparatus provided by the embodiments of the present disclosure.

The embodiments of the present disclosure provide an image recognition apparatus corresponding to an image recognition method. With reference to FIG. 8, FIG. 8 is a schematic structural diagram I of the image recognition apparatus provided by the embodiments of the present disclosure. The image recognition apparatus 300 provided by the embodiments of the present disclosure includes:

a detection module 310, configured to perform image detection on an image to be recognized to obtain at least one face detection result, at least one operational part detection result, and at least one trunk detection result, each face detection result including one face bounding box, each operational part detection result including one operational part bounding box, and each trunk detection result including one trunk bounding box;

a combination module 320, configured to respectively combine each of the at least one trunk detection result with each face detection result, to obtain at least one first result combination, and respectively combine each trunk detection result with each operational part detection result, to obtain at least one second result combination; and an association module 330, configured to associate the at least one first result combination with the at least one second result combination, to obtain an association result.

In some embodiments of the present disclosure, the association module 330 is specifically used for respectively performing feature extraction on each trunk detection result, each face detection result and each operational part detection result, to obtain the trunk feature sequence corresponding to each trunk detection result, the face feature sequence corresponding to each face detection result, and the operational part feature sequence corresponding to each operational part detection result; according to the trunk feature sequence and the face feature sequence, the trunk detection result and the face detection result of each first result combination are associated to obtain the first sub-association result corresponding each first result combination; according to the trunk feature sequence and the operational part feature sequence, the trunk detection result and the operational part detection result of each second result combination are associated to obtain the at least one second sub-association result corresponding each second result combination; according to each first sub-association result and each second sub-association result, the association result is determined.

In some embodiments of the present disclosure, the association module 330 is specifically used for determining, according to each first sub-association result, the associated first result combination with the trunk detection result associated with the face detection result in at least one first result combination; determining, according to each second sub-association result, the associated second result combination with the trunk detection result associated with the operational part detection result in at least one second result combination; where the face represented by the face detection result in one association first result combination is mutually associated with the operational part represented by the operational part detection result in the associated second result combination that is associated with the associated first result combination.

In some embodiments of the present disclosure, the association module 330 is specifically used for: for each of the at least one first result combination, obtaining the first combination feature corresponding to the first result combination by splicing the face feature sequence corresponding to the face detection result in the first result combination and the trunk feature sequence corresponding to the trunk detection result in the first result combination; and classifying each first result combination using the first combination feature corresponding to each first result combination, to obtain the first sub-association result corresponding to each first result combination.

In some embodiments of the present disclosure, the association module 330 is specifically used for: for each of the at least one second result combination, obtaining the second combination feature corresponding to the second result combination by splicing the trunk feature sequence corresponding to the trunk detection result in the second result combination and the operational part feature sequence corresponding to the operational part detection result in the second result combination; and classifying each second result combination using the second combination feature corresponding to each second result combination, to obtain the second sub-association result.

In some embodiments of the present disclosure, the association module 330 is specifically used for respectively preforming feature extraction on a trunk image in each trunk detection result, a face image in each face detection result and an operational part image in each operational part detection result, to obtain a trunk appearance feature of each trunk detection result, a face appearance feature of each face detection result, and an operational part appearance feature of each operational part detection result; determining a trunk position feature of each trunk detection result according to coordinate information of a trunk bounding box in each trunk detection result; determining a face position feature of each face detection result according to coordinate information of a face bounding box in each face detection result; and determining an operational part position feature of each operational part detection result according to coordinate information of an operational part bounding box in each operational part detection result; and obtaining the trunk feature sequence of each trunk detection result by splicing the trunk appearance feature and the trunk position feature of each trunk detection result; obtaining the face feature sequence of each face detection result by splicing the face appearance feature and the face position feature of each face detection result; and obtaining the operational part feature sequence of each operational part detection result by splicing the operational part appearance feature and the operational part position feature of each operational part detection result.

In some embodiments of the present disclosure, the association module 330 is specifically used for generating a trunk region position parameter of each trunk detection result according to the coordinate information of each trunk bounding box; generating a face region position parameter of each face detection result according to the coordinate information of each face bounding box; and generating an operational part region position parameter of each operational part detection result according to the coordinate information of each operational part bounding box; based on a preset trunk sequence bit number, a preset trunk feature construction model and a trunk feature construction parameter, constructing a trunk position sequence of each trunk detection result according to the trunk region position parameter of each trunk detection result, and generating a trunk position feature of each trunk detection result according to the trunk position sequence of each trunk detection result, where the trunk feature construction parameter is generated according to the preset trunk sequence bit number; based on a preset face sequence bit number, a preset face feature construction model, and a face feature construction parameter, constructing a face position sequence of each face detection result according to the face region position parameter of each face detection result, and generating a face position feature of each face detection result according to the face position sequence of each face detection result, where the face feature construction parameter is generated according to the preset face sequence bit number; and based on a preset operational part sequence bit number, a preset operational part feature construction model, and an operational part feature construction parameter, constructing an operational part position sequence of each operational part detection result according to the operational part region position parameter of each operational part detection result, and generating an operational part position feature of each operational part detection result according to the operational part position sequence of each operational part detection result, where the operational part feature construction parameter is generated according to the preset operational part sequence bit number.

In some embodiments of the present disclosure, the association module 330 is specifically used for dividing the region position parameter of each detection result by the feature construction parameter, to obtain a first parameter ratio of each detection result under the condition that the preset sequence bit number is the even number bit and the preset feature construction model is the sine construction model; performing sine value calculation on the first parameter ratio of each detection result using the sine construction model, to obtain a first position element of each detection result; and determining the position sequence of each detection result according to the first position element of each detection result; where when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence; when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

In some embodiments of the present disclosure, the association module 330 is specifically used for, under the condition that the preset sequence bit number is the odd number bit and the preset feature construction model is the cosine construction model, dividing the region position parameter of each detection result by the feature construction parameter, to obtain a second parameter ratio of each detection result;

performing cosine value calculation on the second parameter ratio of each detection result using the cosine construction model, to obtain a second position element of each detection result; and determining a position sequence of each detection result according to the second position element of each detection result, where when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence;

when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence being the face position sequence; and when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

In some embodiments of the present disclosure, the association module 330 is specifically used for, according to the coordinate information of the trunk bounding box in each trunk detection result, calculating the width, height, and area of the trunk bounding box in each trunk detection result; and according to the coordinate information of the face bounding box in each face detection result, calculating the width, height, and area of the face bounding box in each face detection result; according to the coordinate information of the operational part bounding box in each operational part detection result, calculating the width, height, and area of the operational part bounding box in each operational part detection result; using at least one of the coordinate information, width, height, and area of the trunk bounding box in each trunk detection result for constructing the trunk region position parameter of each trunk detection result; using at least one of the coordinate information, width, height, and area of the face bounding box in each face detection result for constructing the face region position parameter of each face detection result; and using at least one of the coordinate information, width, height, and area of the operational part bounding box in each operational part detection result for constructing the operational part region position parameter of each operational part detection result.

In some embodiments of the present disclosure, the association module 330 is specifically used for obtaining at least one feature map corresponding to the image to be recognized; obtaining a trunk feature map of each trunk detection result from each of the at least one feature map; performing region division on the trunk feature map of each trunk detection result, to obtain at least one trunk feature sub-region, and performing maximum value feature extraction on each trunk feature sub-region, to obtain at least one trunk appearance sub-feature corresponding to each trunk detection result; and constructing a trunk appearance feature of each trunk detection result with the at least one trunk appearance sub-feature corresponding to each trunk detection result; obtaining a face feature map of each face detection result from each of the at least one feature map; performing region division on the face feature map of each face detection result, to obtain at least one face feature sub-region, and performing maximum value feature extraction on each face feature sub-region, to obtain at least one face appearance sub-feature corresponding to each face detection result; and constructing a face appearance feature of each face detection result with the at least one face appearance sub-feature corresponding to each face detection result; and obtaining an operational part feature map of each operational part detection result from each of the at least one feature map; performing region division on the operational part feature map of each operational part detection result, to obtain at least one operational part feature sub-region, and performing maximum value feature extraction on each operational part feature sub-region, to obtain at least one operational part appearance sub-feature corresponding to each operational part detection result; and constructing an operational part appearance feature of each operational part detection result with the at least one operational part appearance sub-feature corresponding to each operational part detection result.

In some embodiments of the present disclosure, the detection module 310 is specifically used for generating at least one candidate bounding box for the image to be recognized according to the present detection region generation rule; for the image selected by means of a box from each candidate bounding box in the at least one candidate bounding box, calculating the trunk probability; according to the trunk probability and the preset overlapping degree threshold, selecting at least one trunk bounding box from the at least one candidate bounding box, so as to obtain at least one trunk detection result; for the image selected by means of a box from each candidate bounding box in the at least one candidate bounding box, calculating the face probability; according to the face probability and the preset overlapping degree threshold, selecting at least one face bounding box from the at least one candidate bounding box, so as to obtain at least one face detection result; for the image selected by means of a box from each candidate bounding box in the at least one candidate bounding box, calculating the operational part probability; and according to the operational part probability and the preset overlapping degree threshold, selecting at least one operational part bounding box is selected from the at least one candidate bounding box, so as to obtain at least one operational part detection result.

In some embodiments of the present disclosure, the detection module 310 is specifically used for according to a preset initial size, generating an initial bounding box; and performing dimension conversion and stretching conversion on the initial bounding box, to obtain at least one candidate bounding box.

In some embodiments of the present disclosure, the detection module 310 is specifically used for according to the trunk probability, the face probability, and the operational part probability, respectively selecting the at least one temporary trunk bounding box, the at least one temporary face bounding box, and the at least one temporary operational part bounding box from the at least one candidate bounding box; using the temporary trunk bounding box with the trunk probability as the greatest as a first trunk bounding box; using the first trunk bounding box and the trunk image selected from the first trunk bounding box by means of a box for constituting a first trunk detection result; from the at least one temporary trunk bounding box, removing the temporary trunk bounding box having an overlapping degree with the first trunk bounding box exceeding the preset overlapping degree threshold, to obtain the at least one intermediate trunk bounding box; using the at least one intermediate trunk bounding box as the at least one temporary trunk bounding box, for continuously executing the process above, until the at least one trunk detection result is obtained; using the temporary face bounding box with the face probability as the greatest as a first face bounding box; using the first face bounding box and the face image selected from the first face bounding box by means of a box for constituting a first face detection result; from the at least one temporary face bounding box, removing the temporary face bounding box having an overlapping degree with the first face bounding box exceeding the preset overlapping degree threshold, to obtain the at least one intermediate face bounding box; using the at least one intermediate face bounding box as the at least one temporary face bounding box, for continuously executing the process above, until the at least one face detection result is obtained; using the temporary operational part bounding box with the operational part probability as the greatest as a first operational part bounding box; using the first operational part bounding box and the operational part image selected from the first operational part bounding box by means of a box for constituting a first operational part detection result; from the at least one temporary operational part bounding box, removing the temporary operational part bounding box having an overlapping degree with the first operational part bounding box exceeding the preset overlapping degree threshold, to obtain the at least one intermediate operational part bounding box; and using the at least one intermediate operational part bounding box as the at least one temporary operational part bounding box, for continuously executing the process above, until the at least one operational part detection result is obtained.

It should be explained that in actual applications, the above detection module 310, combination module 320, and association module 330 may be implemented by means of a processor 810 located on an electronic device 800, which may specifically be implemented by means of a Central Processing Unit (CPU), a Microprocessor Unit (MPU), a Digital Signal Processing (DSP), or a Field Programmable Gate Array (FPGA).

Figure 9:
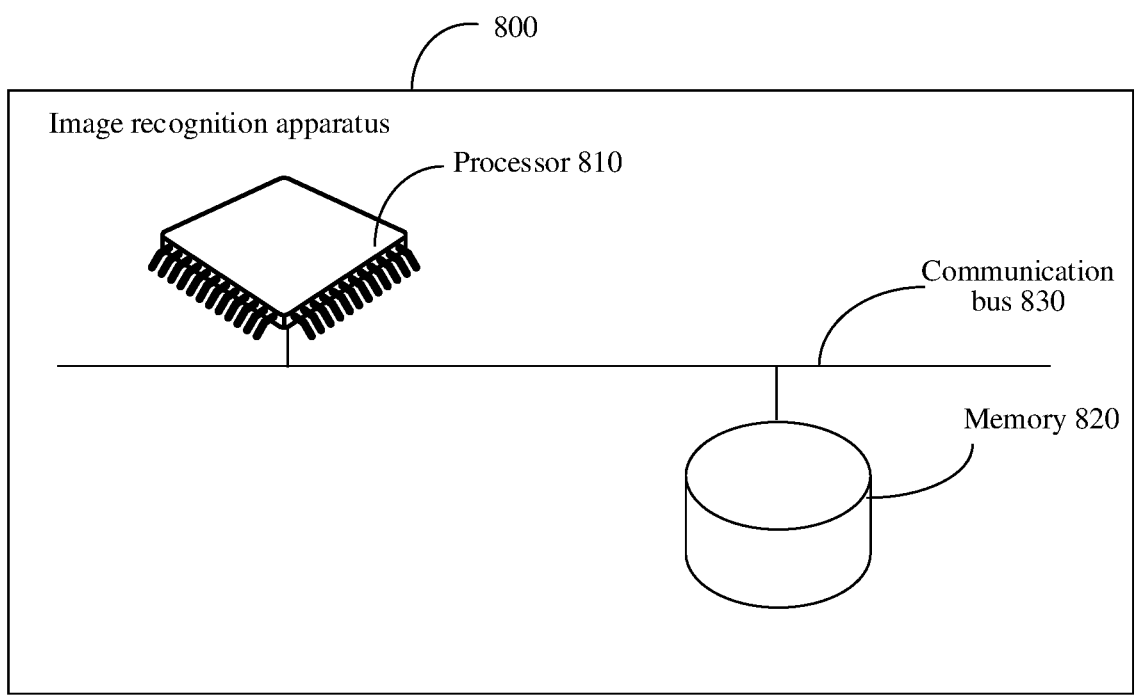
FIG. 9 is a schematic structural diagram II of an electronic device provided by the embodiments of the present disclosure.

The embodiments of the present disclosure provide an electronic device for executing the image recognition method provided by the embodiments of the present disclosure; FIG. 9 is a schematic structural diagram II of the electronic device provided by the embodiments of the present disclosure; as shown in FIG. 9, the image recognition apparatus 800 includes the processor 810, the memory 820, and the communication bus 830; the memory 820 communicates with the processor 810 by means of the communication bus 830; the memory 820 stores one or more programs that may be executed by the processor 810; and if one or more programs are executed, the processor 810 executes any one image recognition method according to the preceding embodiments.

The embodiments of the present disclosure provide a computer-readable storage medium, where the computer-readable storage medium stores one or more programs; one or more programs may be executed by one or more processors 810; and the image recognition method, as shown in the embodiments of the present disclosure, is realized when the program is executed by the processor 810.

A person skilled in the art should understand that the embodiments of the present disclosure may provide a method, a system or a computer program product. Therefore, the present disclosure may use the forms of hardware embodiments, software embodiments, or the embodiments of combining software and hardware aspects. Moreover, the present disclosure may use the form of the computer program product implemented over one or more computer usable storage mediums (including but not limited to a disk memory and an optical memory, etc.) that include a computer usable program code.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

The foregoing descriptions are merely preferred embodiments of the present disclosure, but are not intended to limit the scope of protection of the present disclosure.

The invention claimed is:

1. An image recognition method, comprising:
performing image detection on an image to be recognized to obtain at least one face detection result, at least one operational part detection result and at least one trunk detection result, each face detection result comprising one face bounding box, each operational part detection result comprising one operational part bounding box, and each trunk detection result comprising one trunk bounding box, wherein an operational part corresponding to each operational part detection result comprises at least one of a hand or a foot of a person;
respectively combining each of the at least one trunk detection result with each face detection result, to obtain at least one first result combination;
respectively combining each trunk detection result with each operational part detection result, to obtain at least one second result combination; and
associating the at least one first result combination with the at least one second result combination, to obtain an association result, wherein the association result is a determination as to whether each face detection result and each operational part detection result belong to a same person.

2. The method according to claim 1, wherein associating the at least one first result combination with the at least one second result combination, to obtain the association result comprises:
respectively preforming feature extraction on each trunk detection result, each face detection result and each operational part detection result, to obtain a trunk feature sequence corresponding to each trunk detection result, a face feature sequence corresponding to each face detection result, and an operational part feature sequence corresponding to each operational part detection result;
associating the trunk detection result of each first result combination with the face detection result of said each first result combination according to the trunk feature sequence and the face feature sequence, to obtain a first sub-association result corresponding to each first result combination;
associating the trunk detection result of each second result combination with the operational part detection result of said each second result combination according to the trunk feature sequence and the operational part feature sequence, to obtain a second sub-association result corresponding to each second result combination; and
determining the association result according to each first sub-association result and each second sub-association result.

3. The method according to claim 2, wherein determining the association result according to each first sub-association result and each second sub-association result comprises:
determining associated first result combinations having the trunk detection result associated with the face detection result in the at least one first result combination according to each first sub-association result;
determining associated second result combinations having the trunk detection result associated with the operational part detection result in the at least one second result combination according to each second sub-association result; and determining that the associated first result combination and the associated second result combination having a same trunk detection result are associated, wherein a face represented by the face detection result in the associated first result combination is mutually associated with an operational part represented by the operational part detection result in the associated second result combination that is associated with the associated first result combination.

4. The method according to claim 2, wherein associating the trunk detection result of each first result combination with the face detection result of said each first result combination according to the trunk feature sequence and the face feature sequence, to obtain the first sub-association result corresponding to each first result combination, comprises:

for each of the at least one first result combination, obtaining a first combination feature corresponding to the first result combination by splicing the face feature sequence corresponding to the face detection result in the first result combination and the trunk feature sequence corresponding to the trunk detection result in the first result combination; and classifying each first result combination using the first combination feature corresponding to each first result combination, to obtain the first sub-association result corresponding to each first result combination.

5. The method according to claim 2, wherein associating the trunk detection result of each second result combination with the operational part detection result of said each second result combination according to the trunk feature sequence and the operational part feature sequence, to obtain the second sub-association result corresponding to each second result combination, comprises:

for each of the at least one second result combination, obtaining a second combination feature corresponding to the second result combination by splicing the trunk feature sequence corresponding to the trunk detection result in the second result combination and the operational part feature sequence corresponding to the operational part detection result in the second result combination; and classifying each second result combination using the second combination feature corresponding to each second result combination, to obtain the second sub-association result corresponding to each second result combination.

6. The method according to claim 2, wherein respectively preforming feature extraction on each trunk detection result, each face detection result and each operational part detection result, to obtain the trunk feature sequence corresponding to each trunk detection result, the face feature sequence corresponding to each face detection result, and the operational part feature sequence corresponding to each operational part detection result, comprises:

respectively preforming feature extraction on a trunk image in each trunk detection result, a face image in each face detection result and an operational part image in each operational part detection result, to obtain a trunk appearance feature of each trunk detection result, a face appearance feature of each face detection result, and an operational part appearance feature of each operational part detection result;

determining a trunk position feature of each trunk detection result according to coordinate information of the trunk bounding box in each trunk detection result; determining a face position feature of each face detection result according to coordinate information of the face bounding box in each face detection result; and determining an operational part position feature of each operational part detection result according to coordinate information of the operational part bounding box in each operational part detection result; and obtaining the trunk feature sequence of each trunk detection result by splicing the trunk appearance feature and the trunk position feature of each trunk detection result; obtaining the face feature sequence of each face detection result by splicing the face appearance feature and the face position feature of each face detection result; and obtaining the operational part feature sequence of each operational part detection result by splicing the operational part appearance feature and the operational part position feature of each operational part detection result.

7. The method according to claim 6, wherein determining the trunk position feature of each trunk detection result according to the coordinate information of the trunk bounding box in each trunk detection result, determining the face position feature of each face detection result according to coordinate information of the face bounding box in each face detection result, and determining the operational part position feature of each operational part detection result according to coordinate information of the operational part bounding box in each operational part detection result, comprises:

generating a trunk region position parameter of each trunk detection result according to the coordinate information of each trunk bounding box; generating a face region position parameter of each face detection result according to the coordinate information of each face bounding box; and generating an operational part region position parameter of each operational part detection result according to the coordinate information of each operational part bounding box;

based on a preset trunk sequence bit number, a preset trunk feature construction model and a trunk feature construction parameter, constructing a trunk position sequence of each trunk detection result according to the trunk region position parameter of each trunk detection result, and generating the trunk position feature of each trunk detection result according to the trunk position sequence of each trunk detection result, wherein the trunk feature construction parameter is generated according to the preset trunk sequence bit number;

based on a preset face sequence bit number, a preset face feature construction model, and a face feature construction parameter, constructing a face position sequence of each face detection result according to the face region position parameter of each face detection result, and generating the face position feature of each face detection result according to the face position sequence of each face detection result, wherein the face feature construction parameter is generated according to the preset face sequence bit number; and based on a preset operational part sequence bit number, a preset operational part feature construction model, and an operational part feature construction parameter, constructing an operational part position sequence of each operational part detection result according to the operational part region position parameter of each operational part detection result, and generating the operational part position feature of each operational part detection result according to the operational part position sequence of each operational part detection result, wherein the operational part feature construction parameter is generated according to the preset operational part sequence bit number.

8. The method according to claim 7, wherein when a preset sequence bit number is an even number bit and a preset feature construction model is a sine construction model, the position sequence is determined by:
dividing the region position parameter of each detection result by the feature construction parameter, to obtain a first parameter ratio of each detection result;
performing sine value calculation on the first parameter ratio of each detection result using the sine construction model, to obtain a first position element of each detection result; and
determining the position sequence of each detection result according to the first position element of each detection result,
wherein when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence;
when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and
when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

9. The method according to claim 7, wherein when a preset sequence bit number is an odd number bit and a preset feature construction model is a cosine construction model, the position sequence is determined by:
dividing the region position parameter of each detection result by the feature construction parameter, to obtain a second parameter ratio of each detection result;
performing cosine value calculation on the second parameter ratio of each detection result using the cosine construction model, to obtain a second position element of each detection result; and
determining the position sequence of each detection result according to the second position element of each detection result,
wherein when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence;
when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and
when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

10. The method according to claim 6, wherein respectively preforming feature extraction on the trunk image in each trunk detection result, the face image in each face detection result, and the operational part image in each operational part detection result, to obtain the trunk appearance feature of each trunk detection result, the face appearance feature of each face detection result, and the operational part appearance feature of each operational part detection result, comprises:
obtaining at least one feature map corresponding to the image to be recognized;
obtaining a trunk feature map of each trunk detection result from each of the at least one feature map; performing region division on the trunk feature map of each trunk detection result, to obtain at least one trunk feature sub-region, and performing maximum value feature extraction on each trunk feature sub-region, to obtain at least one trunk appearance sub-feature corresponding to each trunk detection result; and constructing a trunk appearance feature of each trunk detection result with the at least one trunk appearance sub-feature corresponding to each trunk detection result;
obtaining a face feature map of each face detection result from each of the at least one feature map; performing region division on the face feature map of each face detection result, to obtain at least one face feature sub-region, and performing maximum value feature extraction on each face feature sub-region, to obtain at least one face appearance sub-feature corresponding to each face detection result; and constructing the face appearance feature of each face detection result using the at least one face appearance sub-feature corresponding to each face detection result; and
obtaining an operational part feature map of each operational part detection result from each of the at least one feature map; performing region division on the operational part feature map of each operational part detection result, to obtain at least one operational part feature sub-region, and performing maximum value feature extraction on each operational part feature sub-region, to obtain at least one operational part appearance sub-feature corresponding to each operational part detection result; and constructing the operational part appearance feature of each operational part detection result using the at least one operational part appearance sub-feature corresponding to each operational part detection result.

11. An image recognition apparatus, comprising:
a memory, configured to store computer-executable instructions; and a processor, configured to execute the stored computer-executable instructions to perform operations of:

performing image detection on an image to be recognized to obtain at least one face detection result, at least one operational part detection result and at least one trunk detection result, each face detection result comprising one face bounding box, each operational part detection result comprising one operational part bounding box, and each trunk detection result comprising one trunk bounding box, wherein an operational part corresponding to each operational part detection result comprises at least one of a hand or a foot of a person;

respectively combining each of the at least one trunk detection result with each face detection result, to obtain at least one first result combination;

respectively combining each trunk detection result with each operational part detection result, to obtain at least one second result combination; and associating the at least one first result combination with the at least one second result combination, to obtain an association result, wherein the association result is a determination as to whether each face detection result and each operational part detection result belong to a same person.

12. The apparatus according to claim 11, wherein associating the at least one first result combination with the at least one second result combination, to obtain the association result comprises:

respectively preforming feature extraction on each trunk detection result, each face detection result and each operational part detection result, to obtain a trunk feature sequence corresponding to each trunk detection result, a face feature sequence corresponding to each face detection result, and an operational part feature sequence corresponding to each operational part detection result;

associating the trunk detection result of each first result combination with the face detection result of said each first result combination according to the trunk feature sequence and the face feature sequence, to obtain a first sub-association result corresponding to each first result combination;

associating the trunk detection result of each second result combination with the operational part detection result of said each second result combination according to the trunk feature sequence and the operational part feature sequence, to obtain a second sub-association result corresponding to each second result combination; and determining the association result according to each first sub-association result and each second sub-association result.

13. The apparatus according to claim 12, wherein determining the association result according to each first sub-association result and each second sub-association result comprises:

determining associated first result combinations having the trunk detection result associated with the face detection result in the at least one first result combination according to each first sub-association result;

determining associated second result combinations having the trunk detection result associated with the operational part detection result in the at least one second result combination according to each second sub-association result; and determining that the associated first result combination and the associated second result combination having a same trunk detection result are associated, wherein a face represented by the face detection result in the associated first result combination is mutually associated with an operational part represented by the operational part detection result in the associated second result combination that is associated with the associated first result combination.

14. The apparatus according to claim 12, wherein associating the trunk detection result of each first result combination with the face detection result of said each first result combination according to the trunk feature sequence and the face feature sequence, to obtain the first sub-association result corresponding to each first result combination, comprises:

for each of the at least one first result combination, obtaining a first combination feature corresponding to the first result combination by splicing the face feature sequence corresponding to the face detection result in the first result combination and the trunk feature sequence corresponding to the trunk detection result in the first result combination; and classifying each first result combination using the first combination feature corresponding to each first result combination, to obtain the first sub-association result corresponding to each first result combination.

15. The apparatus according to claim 12, wherein associating the trunk detection result of each second result combination with the operational part detection result of said each second result combination according to the trunk feature sequence and the operational part feature sequence, to obtain the second sub-association result corresponding to each second result combination, comprises:

for each of the at least one second result combination, obtaining a second combination feature corresponding to the second result combination by splicing the trunk feature sequence corresponding to the trunk detection result in the second result combination and the operational part feature sequence corresponding to the operational part detection result in the second result combination; and classifying each second result combination using the second combination feature corresponding to each second result combination, to obtain the second sub-association result corresponding to each second result combination.

16. The apparatus according to claim 12, wherein respectively preforming feature extraction on each trunk detection result, each face detection result and each operational part detection result, to obtain the trunk feature sequence corresponding to each trunk detection result, the face feature sequence corresponding to each face detection result, and the operational part feature sequence corresponding to each operational part detection result, comprises:

respectively preforming feature extraction on a trunk image in each trunk detection result, a face image in each face detection result and an operational part image in each operational part detection result, to obtain a trunk appearance feature of each trunk detection result, a face appearance feature of each face detection result, and an operational part appearance feature of each operational part detection result;

determining a trunk position feature of each trunk detection result according to coordinate information of the trunk bounding box in each trunk detection result; determining a face position feature of each face detection result according to coordinate information of the face bounding box in each face detection result; and determining an operational part position feature of each operational part detection result according to coordinate information of the operational part bounding box in each operational part detection result; and obtaining the trunk feature sequence of each trunk detection result by splicing the trunk appearance feature and the trunk position feature of each trunk detection result; obtaining the face feature sequence of each face detection result by splicing the face appearance feature and the face position feature of each face detection result; and obtaining the operational part feature sequence of each operational part detection result by splicing the operational part appearance feature and the operational part position feature of each operational part detection result.

17. The apparatus according to claim 16, wherein determining the trunk position feature of each trunk detection result according to the coordinate information of the trunk bounding box in each trunk detection result, determining the face position feature of each face detection result according to coordinate information of the face bounding box in each face detection result, and determining the operational part position feature of each operational part detection result according to coordinate information of the operational part bounding box in each operational part detection result, comprises:

generating a trunk region position parameter of each trunk detection result according to the coordinate information of each trunk bounding box; generating a face region position parameter of each face detection result according to the coordinate information of each face bounding box; and generating an operational part region position parameter of each operational part detection result according to the coordinate information of each operational part bounding box;

based on a preset trunk sequence bit number, a preset trunk feature construction model and a trunk feature construction parameter, constructing a trunk position sequence of each trunk detection result according to the trunk region position parameter of each trunk detection result, and generating the trunk position feature of each trunk detection result according to the trunk position sequence of each trunk detection result, wherein the trunk feature construction parameter is generated according to the preset trunk sequence bit number;

based on a preset face sequence bit number, a preset face feature construction model, and a face feature construction parameter, constructing a face position sequence of each face detection result according to the face region position parameter of each face detection result, and generating the face position feature of each face detection result according to the face position sequence of each face detection result, wherein the face feature construction parameter is generated according to the preset face sequence bit number; and based on a preset operational part sequence bit number, a preset operational part feature construction model, and an operational part feature construction parameter, constructing an operational part position sequence of each operational part detection result according to the operational part region position parameter of each operational part detection result, and generating the operational part position feature of each operational part detection result according to the operational part position sequence of each operational part detection result, wherein the operational part feature construction parameter is generated according to the preset operational part sequence bit number.

18. The apparatus according to claim 17, wherein when a preset sequence bit number is an even number bit and a preset feature construction model is a sine construction model, the position sequence is determined by:

dividing the region position parameter of each detection result by the feature construction parameter, to obtain a first parameter ratio of each detection result;

performing sine value calculation on the first parameter ratio of each detection result using the sine construction model, to obtain a first position element of each detection result; and determining the position sequence of each detection result according to the first position element of each detection result, wherein when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence;

when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

19. The apparatus according to claim 17, wherein when a preset sequence bit number is an odd number bit and a preset feature construction model is a cosine construction model, the position sequence is determined by:

dividing the region position parameter of each detection result by the feature construction parameter, to obtain a second parameter ratio of each detection result;

performing cosine value calculation on the second parameter ratio of each detection result using the cosine construction model, to obtain a second position element of each detection result; and determining the position sequence of each detection result according to the second position element of each detection result, wherein when the preset sequence bit number is the preset trunk sequence bit number, then the preset feature construction model is the preset trunk feature construction model, the feature construction parameter is the trunk feature construction parameter, the detection result is the trunk detection result, the region position parameter is the trunk region position parameter, and the position sequence is the trunk position sequence;

when the preset sequence bit number is the preset face sequence bit number, then the preset feature construction model is the preset face feature construction model, the feature construction parameter is the face feature construction parameter, the detection result is the face detection result, the region position parameter is the face region position parameter, and the position sequence is the face position sequence; and when the preset sequence bit number is the preset operational part sequence bit number, then the preset feature construction model is the preset operational part feature construction model, the feature construction parameter is the operational part feature construction parameter, the detection result is the operational part detection result, the region position parameter is the operational part region position parameter, and the position sequence is the operational part position sequence.

20. A non-transitory storage medium having stored thereon computer-executable instructions that, when executed by a processor, cause the processor to perform an image recognition method, the method comprising:

performing image detection on an image to be recognized to obtain at least one face detection result, at least one operational part detection result and at least one trunk detection result, each face detection result comprising one face bounding box, each operational part detection result comprising one operational part bounding box, and each trunk detection result comprising one trunk bounding box, wherein an operational part corresponding to each operational part detection result comprises at least one of a hand or a foot of a person;

respectively combining each of the at least one trunk detection result with each face detection result, to obtain at least one first result combination;

respectively combining each trunk detection result with each operational part detection result, to obtain at least one second result combination; and associating the at least one first result combination with the at least one second result combination, to obtain an association result, wherein the association result is a determination as to whether each face detection result and each operational part detection result belong to a same person.

\* \* \* \* \*